US011343031B2

(12) United States Patent
Xu et al.

(10) Patent No.: US 11,343,031 B2
(45) Date of Patent: May 24, 2022

(54) COMMUNICATION PROCESSING METHOD AND COMMUNICATIONS APPARATUS

(71) Applicant: Huawei Technologies Co., Ltd., Shenzhen (CN)

(72) Inventors: Xiaoying Xu, Shanghai (CN); Qufang Huang, Shanghai (CN); Xing Liu, Shenzhen (CN); Chunhua You, Shanghai (CN); Qinghai Zeng, Shanghai (CN); Haiyan Luo, Shanghai (CN); Mingzeng Dai, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 211 days.

(21) Appl. No.: 16/714,650

(22) Filed: Dec. 13, 2019

(65) Prior Publication Data

US 2020/0119864 A1    Apr. 16, 2020

Related U.S. Application Data

(63) Continuation of application No. PCT/CN2018/091617, filed on Jun. 15, 2018.

(30) Foreign Application Priority Data

Jun. 15, 2017 (CN) .......................... 201710454166.4
Aug. 10, 2017 (CN) .......................... 201710682219.8

(51) Int. Cl.
*H04L 1/22* (2006.01)
*H04W 76/15* (2018.01)
(Continued)

(52) U.S. Cl.
CPC .............. *H04L 1/22* (2013.01); *H04L 1/1858* (2013.01); *H04W 28/06* (2013.01); *H04W 76/15* (2018.02); *H04W 80/08* (2013.01)

(58) Field of Classification Search
CPC . H04L 1/22; H04L 1/1858; H04L 1/08; H04L 1/20; H04W 76/15; H04W 28/06;
(Continued)

(56) References Cited

U.S. PATENT DOCUMENTS 9,055,532 B2 * 6/2015 Park ...................... H04W 76/28
2012/0099500 A1 4/2012 Park et al.
(Continued)

FOREIGN PATENT DOCUMENTS

CN     104869666 A    8/2015
CN     106664737 A    5/2017
(Continued)

OTHER PUBLICATIONS

Ericsson, "Duplication in UL in Dual connectivity," 3GPP TSG RAN WG2 #97bis, Spokane, USA, R2-1702750, total 2 pages, 3rd Generation Partnership Project, Valbonne, France (Apr. 3-7, 2017).
(Continued)

*Primary Examiner* — Kiet Tang
(74) *Attorney, Agent, or Firm* — Leydig, Voit & Mayer, Ltd.

(57) ABSTRACT

Embodiments of this application provide a communication processing method. A data volume report reported by a terminal device includes a data volume on one of at least two paths in a radio bearer in a duplication mode, so that signaling overheads in a data volume reporting process of the terminal device can be reduced.

22 Claims, 16 Drawing Sheets

(51) Int. Cl.
*H04L 1/18* (2006.01)
*H04W 28/06* (2009.01)
*H04W 80/08* (2009.01)

(58) Field of Classification Search
CPC ..... H04W 80/08; H04W 80/02; H04W 76/22; H04W 24/10; H04W 28/0278; H04W 28/04; H04W 76/00; H04W 76/27; H04W 76/28; G06F 15/163
See application file for complete search history.

(56) References Cited

U.S. PATENT DOCUMENTS

| | | | |
|---|---|---|---|
| 2015/0092707 A1 | 4/2015 | Kwon | |
| 2016/0081115 A1 | 3/2016 | Pang et al. | |
| 2017/0111945 A1 | 4/2017 | Yi et al. | |
| 2017/0303170 A1 | 10/2017 | Uchino et al. | |
| 2018/0310202 A1* | 10/2018 | Lohr | H04W 76/27 |
| 2018/0324642 A1* | 11/2018 | Yu | H04W 76/15 |

FOREIGN PATENT DOCUMENTS

| | | |
|---|---|---|
| CN | 106717094 A | 5/2017 |
| CN | 106797578 A | 5/2017 |
| CN | 107147479 A | 9/2017 |
| CN | 107979847 A | 5/2018 |
| CN | 108616909 A | 10/2018 |
| CN | 104380765 B | 4/2019 |
| EP | 3522667 A1 | 8/2019 |
| EP | 3174327 B1 | 5/2020 |
| JP | 2012529841 A | 11/2012 |
| KR | 20100122054 A | 11/2010 |
| KR | 20150035358 A | 4/2015 |
| RU | 2612276 C1 | 3/2017 |
| WO | 2010131850 A2 | 11/2010 |
| WO | 2010143924 A2 | 12/2010 |
| WO | 2016005002 A1 | 1/2016 |
| WO | 2016013899 A1 | 1/2016 |

OTHER PUBLICATIONS

Samsung, "Considerations on Packet Duplication for URLLC," 3GPP TSG-RAN WG2 Meeting #97, Athens, Greece, R2-1701986, total 4 pages, 3rd Generation Partnership Project, Valbonne, France (Feb. 13-17, 2017).

Catt, "Configuration and activation/deactivation of duplication," 3GPP TSG-RAN WG2 Meeting #98, Hangzhou, China, R2-1704247, total 2 pages, 3rd Generation Partnership Project, Valbonne, France (May 15-19, 2017).

Qualcomm Incorporated, "Discussion on PDCP duplication," 3GPP TSG-RAN WG2 Meeting #98, Hangzhou, China, R2-1705056, total 2 pages, 3rd Generation Partnership Project, Valbonne, France (May 15-19, 2017).

Catt, "RLC failure and RLF," 3GPP TSG-RAN WG2 Meeting #98, Hangzhou, China, R2-1704226, total 3 pages, 3rd Generation Partnership Project, Valbonne, France (May 15-19, 2017).

Huawei et al., "Interaction between PDCP/RLC/MAC for packet duplication," 3GPP TSG RAN WG2 Meeting #98, Hangzhou, China, R2-1704836, total 3 pages, 3rd Generation Partnership Project, Valbonne, France (May 15-19, 2017).

"Duplication in UL in Dual connectivity," 3GPP TSG-RAN WG2 #97bis, Spokane, USA, R2-1702750, pp. 1-2, 3rd Generation Partnership Project, Valbonne, France (Apr. 3-7, 2017).

"Dynamic activation/deactivation of packet duplication," 3GPP TSG-RAN2 #98, Hangzhou, China, R2-1704835, pp. 1-2, 3rd Generation Partnership Project, Valbonne, France (May 15-19, 2017).

"Packet Duplication at PDCP," 3GPP TSG-RAN WG2 Meeting #97, Athens, Greece, R2-1701186, pp. 1-2, 3rd Generation Partnership Project, Valbonne, France (Feb. 13-17, 2017).

"3rd Generation Partnership Project; Technical Specification Group Services and System Aspects; Study on Machine-Type Communications (MTC) and other mobile data applications communications enhancements (Release 12)," 3GPP TR 23.887 V12.0.0, pp. 1-151, 3rd Generation Partnership Project, Valbonne, France (Dec. 2013).

"WF on RACH Message 3 Waveform," 3GPP TSG RAN WG1 Meeting #88bis, Spokane, USA, R1-1706396, pp. 1-4, 3rd Generation Partnership Project, Valbonne, France (Apr. 3-7, 2017).

"3rd Generation Partnership Project; Technical Specification Group Radio Access Network; NR; Radio Link Control (RLC) protocol specification (Release 15)," 3GPP TS 38.322 V0.0.2, pp. 1-18, 3rd Generation Partnership Project, Valbonne, France (May 2017).

"3rd Generation Partnership Project; Technical Specification Group Radio Access Network; NR; NR and NG-RAN Overall Description; Stage 2 (Release 15)," 3GPP TS 38.300 V0.2.1, pp. 1-48, 3rd Generation Partnership Project, Valbonne, France (May 2017).

"3rd Generation Partnership Project; Technical Specification Group Radio Access Network; NR; Medium Access Control (MAC) protocol specification(Release 15)," 3GPP TS 38.321 V0.0.3, pp. 1-20, 3rd Generation Partnership Project, Valbonne, France (May 2017).

"3rd Generation Partnership Project; Technical Specification Group Radio Access Network; NR; Packet Data Convergence Protocol (PDCP) specification (Release 15)," 3GPP TS 38.323 V0.0.5, pp. 1-24, 3rd Generation Partnership Project, Valbonne, France (May 2017).

"3rd Generation Partnership Project; Technical Specification Group Radio Access Network; NR; Radio Resource Control (RRC); Protocol specification (Release 15)," 3GPP TS 38.331 V0.0.3, pp. 1-20, 3rd Generation Partnership Project, Valbonne, France (May 2017).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.2.0, pp. 1-330, 3rd Generation Partnership Project, Valbonne, France (Mar. 2017).

"Duplication Impacts to MAC",3GPP TSG-RAN WG2 Meeting #98, Hangzhou, China, R2-1704272, pp. 1-3, 3rd Generation Partnership Project, Valbonne, France (May 15-19, 2017).

"Interaction between PDCP/RLC/MAC for packet duplication," 3GPP TSG RAN WG2 Meeting #98, Hangzhou, China, R2-1704836, pp. 1-3, 3rd Generation Partnership Project, Valbonne, France (May 15-19, 2017).

"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331 V14.2.2, pp. 1-721, 3rd Generation Partnership Project, Valbonne, France (Apr. 2017).

"3rd Generation Partnership Project; Technical Specification Group Radio Access Network; Evolved Universal Terrestrial Radio Access (E-UTRA); Medium Access Control (MAC) protocol specification (Release 14)," 3GPP TS 36.321 V14.2.1, pp. 1-106, 3rd Generation Partnership Project, Valbonne, France (Mar. 2017).

"3rd Generation Partnership Project; Technical Specification Group Radio Access Network; Evolved Universal Terrestrial Radio Access (E-UTRA); Packet Data Convergence Protocol (PDCP) specification (Release 14)," 3GPP TS 36.323 V14.2.0, pp. 1-43, 3rd Generation Partnership Project, Valbonne, France (Mar. 2017).

"Chairman notes," 3GPP TSG-RAN WG2 Meeting #98, Hangzhou, China, XP051286056, total 91pages, 3rd Generation Partnership Project, Valbonne, France (May 15-19, 2017).

\* cited by examiner

First indication message

| First field: indicating a control message for a duplication mode | Second field: an activation/deactivation bit |
|---|---|

FIG. 4

First indication message

| First field: indicating a control message for a duplication mode | Third field: an identifier of a first radio bearer | Second field: activation/deactivation |
|---|---|---|
| Third field: an identifier of a second radio bearer | Second field: activation/deactivation | ... |

FIG. 5

COMMUNICATION PROCESSING METHOD AND COMMUNICATIONS APPARATUS

CROSS-REFERENCE TO RELATED APPLICATIONS

This application is a continuation of International Application No. PCT/CN2018/091617, filed on Jun. 15, 2018, which claims priority to Chinese Patent Application No. 201710454166.4 filed on Jun. 15, 2017 and Chinese Patent Application No. 201710682219.8 filed on Aug. 10, 2017, all of which are incorporated herein by reference in their entireties.

TECHNICAL FIELD

Embodiments of this application relate to the field of wireless communications, and in particular, to a communication processing method and a communications apparatus.

BACKGROUND

In a wireless communications system, a link in a direction from a terminal device to a radio access network is an uplink, and a link in a direction from the radio access network to the terminal device is a downlink. On the uplink and the downlink, the terminal device and the radio access device transmit various types of data, for example, control signaling or service data, based on various protocol layers developed by the 3rd generation partnership project (3GPP) organization. These protocol layers include a physical (PHY) layer, a media access control (MAC) layer, a radio link control (RLC) layer, a packet data convergence protocol (PDCP) layer, a radio resource control (RRC) layer, and the like. Regardless of a layer at which data is transmitted, the data is finally borne at the physical layer and transmitted in wireless space.

With the development of 5th generation mobile communications technologies, some or all of data transmitted by a PDCP entity at the PDCP layer to an RLC entity at the RLC layer is duplicately transmitted on at least one other RLC entity corresponding to the PDCP entity. This processing manner is referred to as a duplication mode. In the duplication mode, a same piece of data may be duplicately transmitted in the wireless space, thereby improving stability of data transmission.

However, how to manage various types of information in the duplication mode to implement data transmission in the duplication mode is a problem that urgently needs a solution.

SUMMARY

Embodiments of this application provide a communication processing method, to manage various types of information in a duplication mode.

A first aspect of the embodiments of the present application provides a communication processing method, including the following content:

determining, by a terminal device, that a data volume report needs to be triggered for one of a first path and a second path that are in a radio bearer in a duplication mode, where in the duplication mode, PDCP data on the radio bearer is transmitted on a first RLC entity corresponding to the first path, and is duplicately transmitted on a second RLC entity corresponding to the second path;

triggering, by the terminal device, the data volume report, where the data volume report indicates a data volume on the one path; and sending, by the terminal device, the data volume report to a radio access network.

The technical solution provided in the first aspect is used to implement notification management of a to-be-transmitted data volume of the terminal device in the duplication mode. The terminal device reports a data volume on one path in one radio bearer in the duplication mode, thereby avoiding signaling overheads caused by reporting data volumes on all paths.

Based on the first aspect, in a first possible implementation of the first aspect, before the determining, by a terminal device, that a data volume report needs to be triggered for one path, the method further includes:

receiving, by the terminal device, a first message sent by the radio access network, where the first message indicates, to the terminal device, the one path for which the data volume report needs to be triggered.

Based on the first aspect, in a second possible implementation of the first aspect, the determining, by a terminal device, that a data volume report needs to be triggered for one path includes:

selecting, by the terminal device, a path with a higher priority from the first path and the second path, as the one path for which the data volume report needs to be triggered; or selecting, by the terminal device based on a data volume, the one path for which the data volume report needs to be triggered, from the first path and the second path.

In the first possible implementation, the one path for which a data volume needs to be notified by the terminal device is indicated by the radio access network. In the second possible implementation, the terminal device determines by itself the one path for which the data volume needs to be notified. The first and the second possible implementations provide a plurality of implementation means for determining the one path for which the data volume needs to be notified.

Based on any one of the first aspect, or the first or the second possible implementation of the first aspect, in a third possible implementation of the first aspect, the method further includes:

receiving, by the terminal device, a second message sent by the radio access network, where the second message indicates a cell or a cell group corresponding to the first path and a cell or a cell group corresponding to the second path; and the sending, by the terminal device, the data volume report to a radio access network includes:

sending, by the terminal device to the radio access network, the data volume report in a cell or a cell group corresponding to the determined one path.

In the third possible implementation, the radio access network designates the cell or the cell group through which the data volume on the one path determined by the terminal device is transmitted to the radio access network.

Based on the third possible implementation of the first aspect, in a fourth possible implementation of the first aspect, the method further includes:

receiving, by the terminal device, a second message sent by the radio access network, where the second message indicates a cell or a cell group corresponding to the first path and a cell or a cell group corresponding to the second path; and the sending, by the terminal device, the data volume report to a radio access network includes:

sending, by the terminal device to the radio access network, the data volume report in a cell or a cell group different from a cell or a cell group corresponding to the determined one path.

In the fourth possible implementation, when the cell corresponding to the one path has no resource, it can still be ensured that the data volume report of the one path is sent to the radio access network.

A second aspect of the embodiments of the present application provides a communication processing method, including the following content:

receiving, by a terminal device, a first indication message sent by a radio access network, where the first indication message indicates whether to activate a duplication mode of a radio bearer, and the duplication mode comprises some or all of data from a PDCP entity of the terminal device on a corresponding first RLC entity on a first path is duplicately transmitted on a corresponding second RLC entity on a second path; and activating or deactivating, by the terminal device, the duplication mode of the radio bearer based on the first indication message.

According to the technical solution provided in the second aspect, activation of the duplication mode can be managed, and whether to activate or deactivate the duplication mode is controlled by the radio access network.

Based on the second aspect, in a first possible implementation of the second aspect, the first indication message includes a first field and a second field, the first field indicates that the first indication message is a control message for the duplication mode, and the second field indicates whether to activate the duplication mode.

Based on the first possible implementation of the second aspect, in a second possible implementation of the second aspect, the first indication message further includes a third field, and the third field indicates the radio bearer corresponding to the duplication mode.

Based on the first possible implementation of the second aspect, in a third possible implementation of the second aspect, the second field indicates, via a bit state of one bit, whether to activate the duplication mode, and indicates, via a bit position of the one bit, the radio bearer corresponding to the duplication mode.

Based on the second aspect, in a fourth possible implementation of the second aspect, the first indication message includes a first field and a second field, the first field indicates that the first indication message is a control message for the duplication mode, and the second field indicates whether the first path is activated and whether the second path is activated; and if both the first path and the second path are activated, the duplication mode is activated, or if at least one of the first path and the second path is deactivated, the duplication mode is deactivated or the first indication message is an invalid message.

Based on the fourth possible implementation of the second aspect, in a fifth possible implementation of the second aspect, the first indication message further includes a third field, and the third field indicates an identifier of the first path and an identifier of the second path.

Based on the fourth implementation of the second aspect, in a sixth possible implementation of the second aspect, the second field indicates the first path via a position of the first bit; indicates, via a bit state of the first bit, whether the first path is activated; indicates the second path via a position of the second bit; and indicates, via a bit state of the second bit, whether the second path is activated.

Based on the second aspect, in a seventh possible implementation of the second aspect, when the first path is activated, the first indication message includes a first field and a second field, the first field indicates that the first indication message is a control message for the duplication mode, and the second field indicates whether the second path is activated; and if the second path is activated, the duplication mode is activated, or if the second path is deactivated, the duplication mode is deactivated.

Based on the second aspect, in an eighth possible implementation of the second aspect, the first indication message includes a first field and a second field, the first field indicates that the first indication message is a control message for the duplication mode, and the second field indicates whether to activate the duplication mode; when the first indication message is from a cell or a cell group corresponding to the first path, the second field specifically indicates whether the first path is activated, or when the first indication message is from a cell or a cell group corresponding to the second path, the second field specifically indicates whether the second path is activated; and if both the first path and the second path are activated, the duplication mode is activated, or if at least one of the first path and the second path is deactivated, the duplication mode is deactivated.

In any one of the first to the eighth possible implementations of the second aspect, various message structure forms of the first indication message used to indicate whether to activate the duplication mode are provided. This is flexible and easy to implement.

Based on any one of the second aspect, or the first to the eighth possible implementations of the second aspect, in a ninth possible implementation of the second aspect, the method further includes: triggering, by the terminal device, a data volume report indicating a data volume, where when the duplication mode is activated, the data volume indicated in the data volume report includes:

a data volume on one of the first path and the second path or a sum of a data volume on the first path and a data volume on the second path.

In the ninth possible implementation of the second aspect, the data volume report may include data volumes on all paths, or may include a data volume on only one path. This increases flexibility of indicating the data volume in the data volume report.

Based on any one of the second aspect, or the first to the ninth possible implementations of the second aspect, in a tenth possible implementation of the second aspect, the method further includes:

when the first indication message indicates that the duplication mode is activated, determining, by the terminal device, whether there is data on at least one of the PDCP entity and the first RLC entity; and if there is data on at least one of the PDCP entity and the first RLC entity, triggering, by the terminal device, the data volume report.

Based on the tenth possible implementation of the second aspect, in an eleventh possible implementation of the second aspect, the method further includes:

if there is data on the PDCP entity, transmitting, by the terminal device, the data on the PDCP entity to the first RLC entity, and duplicating, to the second RLC entity, the data transmitted to the first RLC entity.

Based on the tenth possible implementation of the second aspect, in a twelfth possible implementation of the second aspect, the method further includes:

if there is data on the first RLC entity, duplicating, by the terminal device, some or all of the data on the first RLC entity to the second RLC entity.

Based on the tenth possible implementation of the second aspect, in a thirteenth possible implementation of the second aspect, the method further includes:

if there is data on the first RLC entity, duplicating, by the terminal device, some or all of the data on the first RLC entity at a MAC layer, and indicating that the duplicated data is from the second path.

According to the technical solution in any one of the tenth and the twelfth possible implementations of the second aspect, the data volume report is triggered if there is to-be-transmitted data that has not been transmitted, and transmission in the duplication mode is performed, so that the radio access network can learn of a to-be-transmitted data volume of the terminal device in a timely manner, and then provide services of the data for the terminal device.

Based on any one of the second aspect, or the first to the twelfth possible implementations of the second aspect, in a thirteenth possible implementation of the second aspect, when the first indication message indicates that the duplication mode is activated, the duplicated data on the first RLC entity and the second RLC entity has a same number.

Based on the thirteenth possible implementation of the second aspect, in a fourteenth possible implementation of the second aspect, the method further includes:

sending, by the terminal device, a second indication message to the radio access network, where the second indication message includes a start number of the duplicated data on the second RLC entity in the duplication mode.

When the thirteenth or the fourteenth possible implementation of the second aspect is applied, the radio access network can correctly learn which data on each path is the duplicated data in the duplication mode.

Based on any one of the second aspect, or the first to the fourteenth possible implementations of the second aspect, in a fifteenth possible implementation of the second aspect, when the first indication message indicates that the duplication mode is activated, and the duplicated data on the first RLC entity and the second RLC entity has different numbers, the method further includes:

notifying, by the terminal device, the radio access device of a difference between the difference numbers of the duplicated data.

When the fifteenth possible implementation of the second aspect is applied, the radio access network can correctly learn which data on each path is the duplicated data in the duplication mode.

Based on any one of the second aspect, or the first to the fifteenth possible implementations of the second aspect, in a sixteenth possible implementation of the second aspect, the method further includes:

receiving, by the terminal device, configuration information sent by the radio access network, where the configuration information indicates the cell or the cell group corresponding to the first path and the cell or the cell group corresponding to the second path.

By applying the sixteenth possible implementation of the second aspect, the terminal device can learn of the cell or the cell group corresponding to each path, so as to send the duplicated data in the corresponding cell or cell group under control of the radio access network.

Based on any one of the second aspect, or the first to the sixteenth possible implementations of the second aspect, in a seventeenth possible implementation of the second aspect, the method further includes: triggering, by the terminal device, the data volume report indicating the data volume; and when the first indication message indicates that the duplication mode is deactivated, the data volume indicated in the data volume report includes: the data volume on the first path.

Based on the seventeenth possible implementation of the second aspect, in an eighteenth possible implementation of the second aspect, the method further includes:

when the first indication message indicates that the duplication mode is deactivated, determining, by the terminal device, whether there is data on the second RLC entity; and if there is data on the second RLC entity, triggering, by the terminal device, the data volume report, where the data volume indicated in the data volume report further includes a data volume on the second RLC entity.

By applying the seventeenth and the eighteenth possible implementations of the second aspect, although the duplication mode is deactivated, the terminal may still send non-duplicated data on the second RLC entity. In this case, the data volume report still includes the data on the second RLC entity, so that the radio access network can accurately obtain the to-be-transmitted data volume of the terminal device in a timely manner when the duplication mode is deactivated.

Based on any one of the second aspect, or the first to the eighteenth possible implementations of the second aspect, in a nineteenth possible implementation of the second aspect, when the first indication message indicates that the duplication mode is deactivated, the method further includes at least one of the following:

determining, by the terminal device, not to duplicate, on the second RLC entity, the data on the PDCP entity that is transmitted to the first RLC entity;

discarding, by the terminal device, duplicated data on the second RLC entity;

discarding, by the terminal device, all duplicated data at the MAC layer that is from the second RLC entity, or discarding duplicated data at the MAC layer that is from the second RLC entity and that is not stored into a HARQ buffer;

determining, by the terminal device, duplicated data on the second RLC entity that does not need to be transmitted through an air interface, and if the determined duplicated data on the second RLC entity has started to be transmitted through the air interface, continuing to transmit, by the transmit device, the determined duplicated data on the second RLC entity; or transmitting, by the terminal device, data that is from the PDCP entity and that is not a duplicate of the data on the first RLC entity.

By applying the technical solution in the nineteenth possible implementation of the second aspect, when the duplication mode is deactivated, the terminal can discard unnecessary duplicated data, so as to reduce a waste of resources.

Based on any one of the second aspect, or the first to the nineteenth possible implementations of the second aspect, in a twentieth possible implementation of the second aspect, the method further includes:

when a quantity of retransmission times of the duplicated data on the second RLC entity reaches a maximum quantity of RLC retransmission times, determining, by the terminal device, that a radio link failure does not be triggered, or triggering a radio link failure but no reestablishing a radio link.

According to the twentieth possible implementation of the second aspect, that a quantity of retransmission times of the duplicated data on the second RLC entity reaches a maximum quantity of RLC retransmission times indicates network quality degradation. Because the first RLC entity can still transmit data in the duplication mode, the terminal does not need to trigger the radio link failure, or does not reestablish the radio link even if triggering the radio link failure. This can reduce an interruption delay due to radio link reestablishment that is caused when the maximum quantity of retransmission times is reached.

A third aspect of the embodiments of this application provides a communications apparatus. The communications apparatus includes a processing unit and a sending unit. The processing unit is configured to perform processing actions such as determining and triggering that are performed by the terminal device in any one of the first aspect or the possible implementations of the first aspect, and the sending unit is configured to perform sending actions of the terminal device in any one of the first aspect or the possible implementations of the first aspect. The communications apparatus further includes a receiving unit, configured to perform receiving actions of the terminal device in any one of the first aspect or the possible implementations of the first aspect. Optionally, the communications apparatus is the terminal device or a part of the terminal device. Optionally, the processing unit may be a processor of the terminal device, the sending unit may be a transmitter of the terminal device, and the receiving unit is a receiver of the terminal device. Further, the terminal device may further include another electronic line, for example, a bus connecting the processor and the transmitter, and a radio frequency antenna used for sending a signal. Optionally, the communications apparatus may alternatively be a chip. The technical solution provided in the third aspect has the technical effects of the foregoing corresponding implementations. For details, refer to the foregoing implementations.

A fourth aspect of the embodiments of this application provides a communications apparatus. The communications apparatus includes a processing unit and a receiving unit. The processing unit is configured to perform processing actions such as determining and triggering that are performed by the terminal device in any one of the second aspect or the possible implementations of the second aspect, and the receiving unit is configured to perform receiving actions of the terminal device in any one of the second aspect or the possible implementations of the second aspect. The communications apparatus may further include a sending unit, configured to perform sending actions of the terminal device in any one of the second aspect or the possible implementations of the second aspect. Optionally, the communications apparatus is the terminal device or a part of the terminal device. Optionally, the processing unit may be a processor of the terminal device, the sending unit may be a transmitter of the terminal device, and the receiving unit is a receiver of the terminal device. Further, the terminal device may further include another electronic line, for example, a bus connecting the processor and the transmitter, and a radio frequency antenna used for sending a signal. Optionally, the communications apparatus may alternatively be a chip. The technical solution provided in the fourth aspect has the technical effects of the foregoing corresponding implementations. For details, refer to the foregoing implementations.

A fifth aspect of the embodiments of this application provides a computer storage medium. The computer storage medium includes program code, and the program code is used to implement the technical solution provided in any one of the first aspect, the second aspect, or the possible implementations thereof. The technical solution provided in the fifth aspect has the technical effects of the foregoing corresponding implementations. For details, refer to the foregoing implementations.

A sixth aspect of the embodiments of this application provides a communications apparatus. The communications apparatus includes a processor and a memory. The memory stores code, and the processor invokes the code in the memory, so that all or some of the technical solutions provided in any one of the first aspect, the second aspect, or the possible implementations thereof are implemented. The communications apparatus provided in the sixth aspect may be the terminal device in any one of the foregoing aspects or the possible implementations thereof, or may be a chip. When the communications apparatus is the chip, the chip includes a processor including at least one gate circuit and a memory including at least one gate circuit, each gate circuit includes at least one transistor (for example, a field effect transistor) connected through a conducting wire, and each transistor is made of a semiconductor material.

BRIEF DESCRIPTION OF DRAWINGS

FIG. 4 to FIG. 10 are schematic structural diagrams of a message according to an embodiment of this application;

DESCRIPTION OF EMBODIMENTS

Figure 1A:
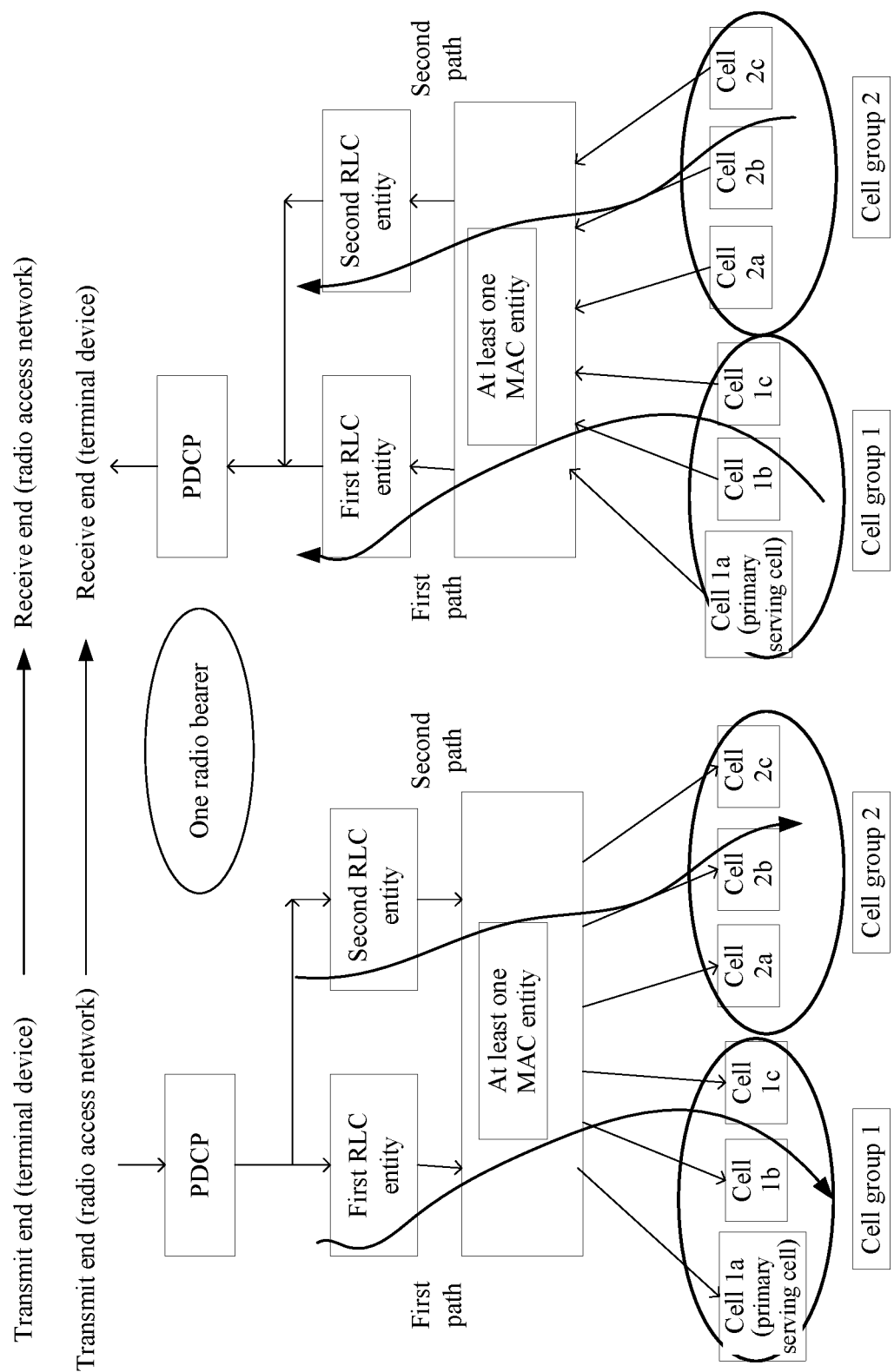
FIG. 1A to FIG. 1H are schematic diagrams of a protocol stack of a wireless communications system according to an embodiment of this application.
Figure 1B:
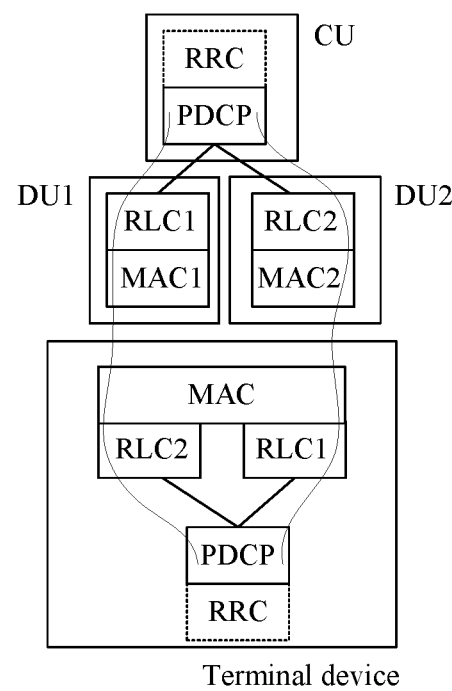
Figure 1C:
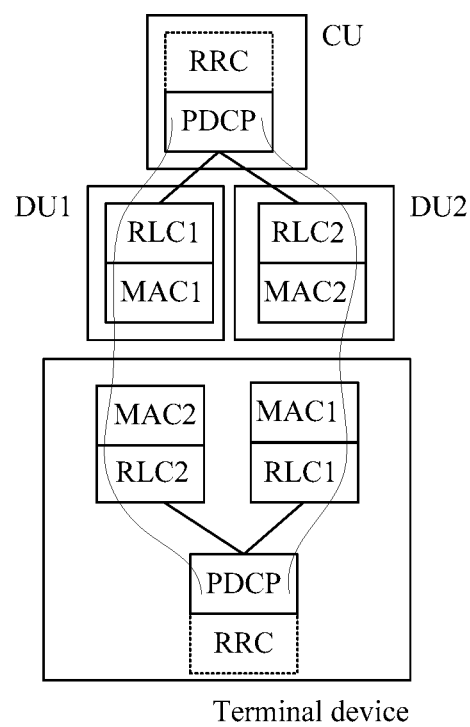
Figure 1D:
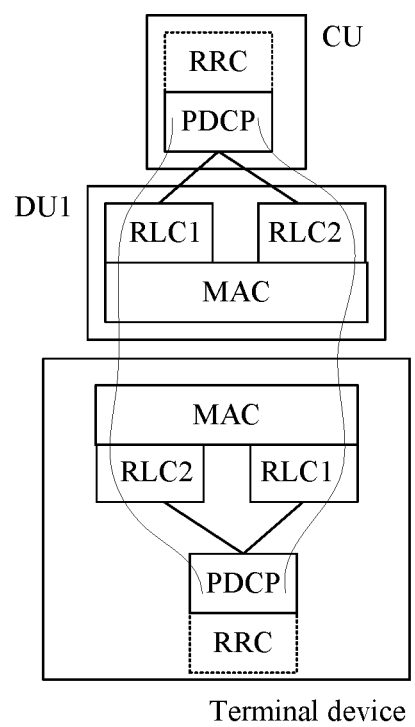
Figure 1E:
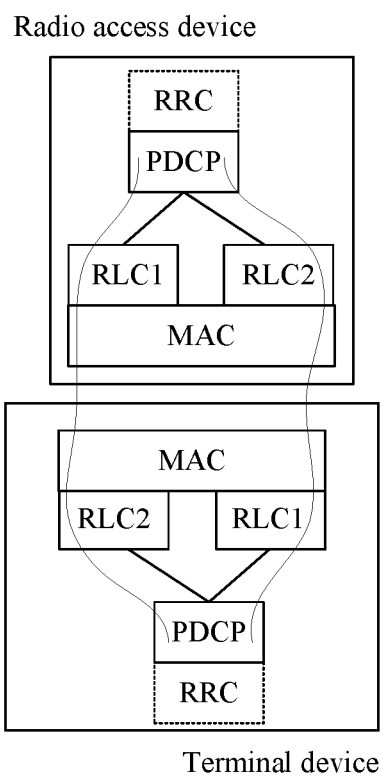
Figure 1F:
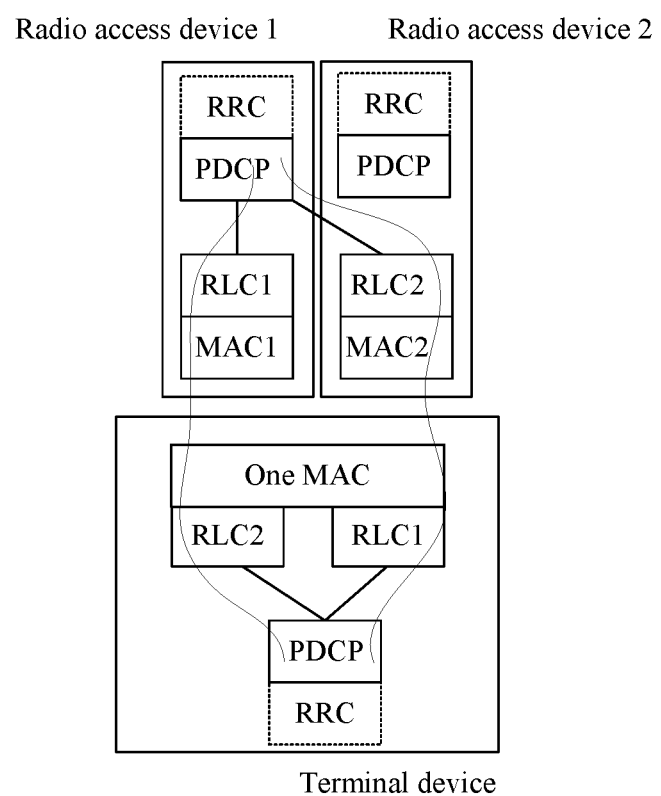

In a schematic architectural diagram of a protocol stack of a wireless communications system shown in FIG. 1A, the wireless communications system includes a terminal device and a radio access network.

The terminal device is also referred to as user equipment (UE) or a mobile station, including a mobile phone, a handheld internet of things device, a wearable device, or the like.

The radio access network includes at least one radio access device, and each radio access device includes an RRC layer, a PDCP layer, an RLC layer, a MAC layer, a PHY layer, and the like. A radio access device may be a base station, a wireless local area network access point, or the like. Base stations may be classified into two categories: macro base stations and small cells, and the small cells are classified into micro base stations, pico base stations, and the like. The wireless local area network access point may be a router, a switch, or the like.

Based on protocol layers, the radio access network may be divided into at least one distributed unit (DU) and one control unit (CU) connected to the at least one distributed unit. Each of the at least one distributed unit includes an RLC layer, a MAC layer, and a PHY layer. The control unit includes a PDCP layer, an RRC layer and a protocol layer above the RRC layer.

Data in the embodiments of this application includes signaling data and service data. The service data includes enhanced mobile broadband (eMBB) data, massive machine type communications (mMTC) data, and ultra-reliable and low latency communications (URLLC) data. In time domain and frequency domain that are at a physical layer, a length occupied by a transmission time unit in time and a width occupied by a transmission frequency unit in frequency may vary with different wireless communication requirements of the service data. A size of the transmission time unit and a size of the transmission frequency unit that are used for data transmission may be defined in the wireless communications system via different wireless parameter configurations. The wireless parameter configurations in a 5th generation mobile communications system may be referred to as numerology parameters or air interface formats.

The foregoing data is transmitted between the terminal device and the radio access network by establishing at least one radio bearer (RB). Radio bearers are classified into two types: signaling radio bearers used to transmit the signaling data and data radio bearers used to transmit the service data. A radio bearer is a configuration of a set of protocol layer entities. A set of functional entities in one radio bearer includes one PDCP entity, at least two RLC entities corresponding to the PDCP entity, at least one MAC entity corresponding to the at least two RLC entities, and at least one PHY entity corresponding to the at least one MAC entity.

In the architectural diagram of the wireless communications system shown in FIG. 1A, for one radio bearer between a transmit end and a receive end, on the transmit end, one PDCP entity corresponds to at least two RLC entities, and each of the RLC entities corresponds to one path for sending data. Correspondingly, on the receive end, one PDCP entity corresponds to at least two RLC entities, and each of the RLC entities corresponds to one path for receiving data. Therefore, the radio bearer between the transmit end and the receive end includes at least two paths.

As shown in FIG. 1A, the transmit end and the receive end each include one PDCP entity, a first RLC entity corresponding to the one PDCP entity, and a second RLC entity corresponding to the one PDCP entity. The first RLC entity corresponds to a first path, and the second RLC entity corresponds to a second path. The transmit end sends data on the first path to the receive end in a cell 1b or a cell group 1 corresponding to the first path, and the receive end receives, in the cell 1b or the cell group 1 corresponding to the first path, the data on the first path that is sent by the transmit end. The transmit end sends data on the second path to the receive end in a cell 2b or a cell group 2 corresponding to the second path, and the receive end receives, in the cell 2b or the cell group 2 corresponding to the second path, the data on the second path. In a duplication mode, data from the one PDCP entity is duplicately transmitted on both the second RLC entity at the transmit end and the first RLC entity at the transmit end, so that stability of data sending by the transmit end can be improved.

Optionally, in a carrier aggregation scenario, the cell group 1 is a master cell group, and the master cell group includes one primary cell and at least one secondary cell, for example, a cell 1a (the primary cell), the cell 1b, and a cell 1c; and the cell group 2 is a secondary cell group, and the secondary cell group includes at least one secondary cell, for example, a cell 2a, the cell 2b, and a cell 2c. The master cell group corresponds to the first RLC entity and the first path. In this case, the first RLC entity is also referred to as a primary RLC entity, and the second RLC entity is also referred to as a secondary RLC entity. The primary cell uses a primary carrier frequency, and the secondary cell uses a secondary carrier frequency.

Optionally, in a carrier aggregation scenario, the cell group 1 is a secondary cell group, and the secondary cell group includes at least one secondary cell, for example, a cell 1a, the cell 1b, and a cell 1c; and the cell group 2 is a master cell group, and the master cell group includes one primary cell and at least one secondary cell, for example, a cell 2a (the primary cell), the cell 2b, and a cell 2c. The master cell group corresponds to the second RLC entity and the second path. In this case, the second RLC entity is referred to as a primary RLC entity, and the first RLC entity is referred to as a secondary RLC entity. The primary cell uses a primary carrier frequency, and the secondary cell uses a secondary carrier frequency.

Figure 1G:
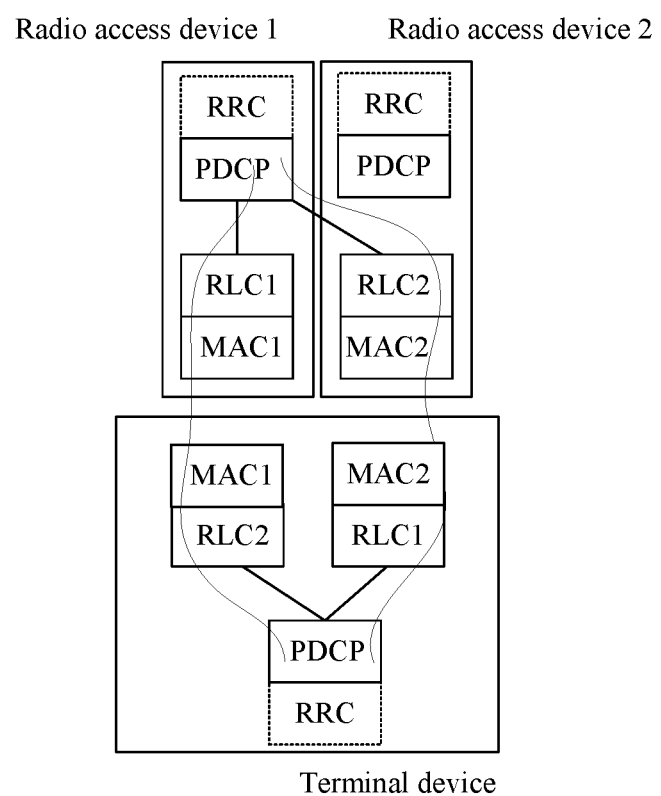

When the carrier aggregation scenario is an inter-radio access device carrier aggregation (also referred to as dual connectivity) scenario, a radio access device to which the master cell group belongs is a primary radio access device, a radio access device to which the secondary cell group belongs is a secondary radio access device, and the terminal device is served by both the primary radio access device and the secondary radio access device. Optionally, as shown in FIG. 1G, the terminal may use two MAC layer entities to separately establish connections to the two radio access devices. During specific implementation of this scenario, the PDCP entity and the first RLC entity corresponding to the PDCP entity are located on the primary radio access device, and the second RLC entity corresponding to the PDCP entity is located on the secondary radio access device; or the PDCP entity and the second RLC entity corresponding to the PDCP entity are located on the primary radio access device, and the first RLC entity corresponding to the PDCP entity is located on the secondary radio access device.

Optionally, in this scenario, the one PDCP entity corresponds to only one primary RLC entity (the first RLC entity), and the PDCP entity corresponds to at least one secondary RLC entity (at least one second RLC entity).

Optionally, physical communications devices divided according to the schematic architectural diagram of the protocol stack of the wireless communications system shown in FIG. 1A may be shown in FIG. 1B to FIG. 1F, and FIG. 1G and FIG. 1H.

It should be noted that in a duplication mode on an uplink, the transmit end is the terminal device, and the receive end is the radio access network; and in a duplication mode on a downlink, the transmit end is the radio access network, and the receive end is the terminal device.

The radio access network may separately configure the duplication mode on the uplink and the duplication mode on the downlink.

For example, the radio access network may separately configure cells or cell groups corresponding to all paths on the uplink and the downlink. A cell or a cell group corresponding to each path on the uplink may be different from a cell or a cell group corresponding to each path on the downlink.

Optionally, in the carrier aggregation scenario, a deactivation timer of a secondary cell in a cell or a cell group corresponding to each path is disabled when a duplication mode is activated, and is enabled when the duplication mode is deactivated (optionally, this may be indicated by the radio access network). This manner can avoid a problem that data cannot be normally transmitted in the activated duplication mode because the secondary cell is disabled as the deactivation timer of the secondary cell expires when the duplication mode is activated.

Optionally, in the carrier aggregation scenario, the radio access network may configure a radio bearer in the duplication mode. However, the configuration of the radio bearer does not include configuration of a deactivation timer of each secondary cell in a secondary cell group (optionally, the configuration of the radio bearer does not include configuration of a deactivation timer of each secondary cell in a master cell group, either), to avoid a problem that data cannot be normally transmitted in the activated duplication mode because the secondary cell is disabled as the deactivation timer of the secondary cell expires when the duplication mode is activated. If a secondary cell is not used for the radio bearer in the duplication mode, the radio access network may configure a deactivation timer of the secondary cell.

Optionally, in the carrier aggregation scenario, when configuring a radio bearer in the duplication mode, the radio access network may configure a deactivation timer of a secondary cell in a cell or a cell group corresponding to each path, but there is data transmitted in the secondary cell before the deactivation timer expires. For example, the radio access network configures specific data transmitted in the secondary cell, and the specific data is transmitted in the secondary cell before the deactivation timer of the secondary cell expires, so that expiration of the deactivation timer does not cause disabling of the secondary cell.

It should be noted that when RLC entities corresponding to one PDCP entity are separately located on different physical devices, in the duplication mode on the downlink, a communications device on which the PDCP entity is located may transmit only one piece of data to a physical device on which one RLC entity is located, and physical devices on which other RLC entities corresponding to the PDCP entity are located duplicate the piece of data to implement the duplication mode, that is, a communications system in which the PDCP entity is located does not need to duplicate the piece of data and then send the data to each of the different physical devices on which the RLC entities corresponding to the PDCP entity are located. For example, in a schematic architectural diagram of the protocol stack of the wireless communications system shown in FIG. 1C, an RLC entity 1 is located on an independent DU1, and an RLC entity 2 is located on an independent DU2. One PDCP entity corresponding to the RLC entity 1 and the RLC entity 2 is located on an independent CU. In this case, in the duplication mode on the downlink, the CU sends a piece of data to one of the DU1 and the DU2, and the other DU duplicates the piece of data sent by the CU. Then both the DU1 and the DU2 send the duplicated data to the terminal device.

Figure 1H:
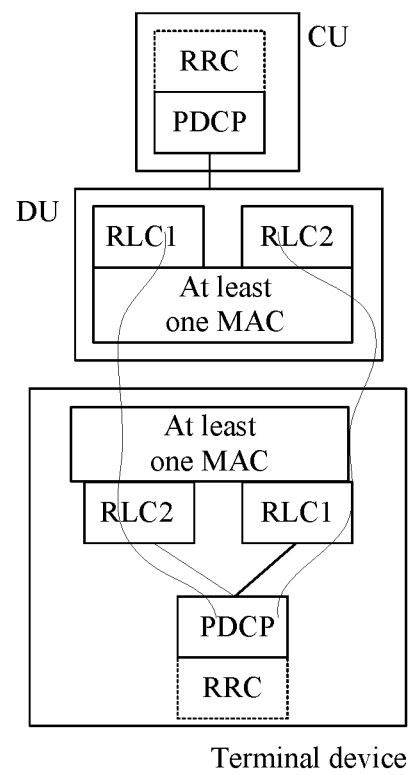

As shown in FIG. 1H, an RLC entity 1 and an RLC entity 2 belong to one DU, and a PDCP entity corresponding to the RLC entity 1 and the RLC entity 2 belongs to a CU. The CU determines a radio bearer corresponding to the PDCP entity when configuring a duplication mode, and notifies the DU of an identifier of the radio bearer corresponding to the RLC entity 1 and the RLC entity 2 that correspond to the PDCP entity, and carriers or cell groups used for a first path and a second path on which the two RLC entities are located.

In the scenario shown in FIG. 1H, the RLC entity 1 and the RLC entity 2 belong to one DU, a transmission path is established between the DU and the CU, the CU sends, on the transmission path, a piece of PDCP data to the DU via the PDCP entity, and the DU duplicates, on a radio bearer on which the piece of PDCP data is located, the piece of PDCP data to the RLC entity 1 and the RLC entity 2 that correspond to the PDCP entity. Optionally, when sending the piece of PDCP data to the DU, the CU may notify the DU of an identifier of the radio bearer on which the piece of PDCP data is located, or at least one of identifiers of the RLC entity 1 (the first path) and the RLC entity 2 (the second path) to which the piece of PDCP data is to be sent. Further, the CU may further notify the DU of an internet protocol (IP) flow which the piece of PDCP data belongs to.

For a case in which the DU sends data to the CU, the DU determines whether data on the two RLC entities in the radio bearer is duplicated data in the duplication mode; and if yes, the DU sends a piece of duplicated data to the CU on the transmission path between the DU and the CU. For example, the DU may determine whether PDCP numbers corresponding to the data on the two RLC entities are the same, and if the PDCP numbers are the same, select data on one of the two RLC entities and send the data to the CU. If there is data with the same PDCP number on an RLC entity on the DU to be sent to the CU, the DU discards the data. For another example, the DU may determine whether RLC numbers corresponding to the data on the two RLC entities are the same, and if the RLC numbers are the same, select data on one of the two RLC entities and send the data to the CU. If there is data with the same RLC number on an RLC entity on the DU to be sent to the CU, the DU discards the data.

In one radio bearer, because one RLC entity corresponds to one path in the duplication mode, an identifier of the one RLC entity may be used to indicate the corresponding one path, or an identifier of the path may be used to indicate the corresponding one RLC entity. In some technical documents, a path in a radio bearer is also referred to as a leg.

Optionally, different paths in one radio bearer are different logical channels, and use different logical channel identifiers, or identifiers of different RLC entities. In this case, the one radio bearer corresponds to at least two logical channels. The two logical channels may belong to a same logical channel group, or may belong to different logical channel groups.

Optionally, at least two paths in one radio bearer belong to a same logical channel, and have a same logical channel identifier. Therefore, the one radio bearer corresponds to the same logical channel. In this case, to distinguish between different paths, the different paths may have a same logical channel identifier, but have different path identifiers.

When the radio bearer is a signaling radio bearer, regardless of whether a duplication mode is configured for the signaling radio bearer, a PDCP layer in the signaling radio bearer sequentially processes PDCP data, for example, performs decryption and integrity check operations. For example, a PDCP layer of the signaling radio bearer at the receive end first receives a No. 2 packet when a No. 1 packet is not yet received. In this case, the PDCP layer needs to wait for arrival of the No. 1 packet, and then process the No. 1 packet and the No. 2 packet.

In the embodiments of this application, duplication modes are separately managed based on different radio bearers. For ease of description and understanding, in the embodiments of this application, duplication mode management of one radio bearer is used as an example. For a case of another radio bearer, refer to duplication mode management of the radio bearer. It should be noted that the radio bearer may be a signaling radio bearer or a data radio bearer.

Without loss of generality, one PDCP entity on one radio bearer corresponds to at least two RLC entities. Using any two RLC entities hereafter: a first RLC entity and a second RLC entity, in the at least two RLC entities as an example, paths on which the two RLC entities are located are a first path and a second path, respectively, and data on the second RLC entity is a duplicate of some or all of data on the first RLC entity.

It should be noted that, some or all of the data on the first RLC entity that is duplicately transmitted on the second RLC entity is from the one PDCP entity. Optionally, the second RLC entity may not duplicately transmit data on the first RLC entity that is not from the PDCP entity and that is generated independently by the first RLC entity.

Figure 2:
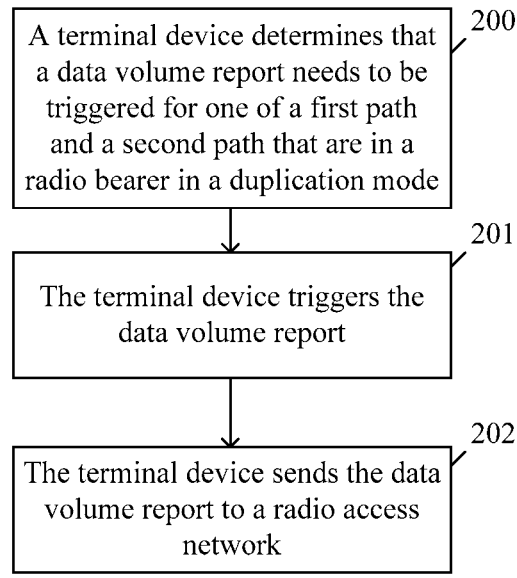
FIG. 2 is a schematic flowchart of communication processing according to an embodiment of this application.

A first embodiment of this application provides a communication processing method, and relates to management of notifying, by a terminal device in a duplication mode, a radio access network of a to-be-transmitted data volume. The first embodiment may be based on an architecture, of the protocol stack of the wireless communications system, shown in any one of FIG. 1A, and FIG. 1B to FIG. 1F. A transmit end is the terminal device, and a receive end is the radio access network. Referring to a schematic flowchart of communication processing shown in FIG. 2, the first embodiment includes the following content.

200. The terminal device determines that a data volume report needs to be triggered for one of a first path and a second path that are in a radio bearer in the duplication mode.

In a possible implementation, the terminal device receives a first message sent by the radio access network, where the first message indicates, to the terminal device, the one path for which the data volume report needs to be triggered. For example, the first message carries an identifier of the one path. The identifier of the one path may be replaced with an identifier of an RLC entity corresponding to the one path.

In another possible implementation, the terminal device selects a path with a higher priority from the first path and the second path, as the one path for which the data volume report needs to be triggered. Optionally, a path on which each RLC entity corresponding to one PDCP entity is located is a logical channel, and a path priority is a logical channel priority.

In another possible implementation, the terminal device selects, based on a data volume on each of the first path and the second path, the one path for which the data volume report needs to be triggered. Although in the duplication mode, a second RLC entity duplicates some or all of data transmitted by the PDCP entity to a first RLC entity, each path has a different to-be-transmitted data volume within a current transmission time unit because each RLC entity has a different data processing speed or there is non-duplicated data on an RLC entity before the duplication. The terminal device may select a path having a smaller data volume, as the one path for which the data volume report needs to be triggered, or may select a path having a larger data volume, as the one path for which the data volume report needs to be triggered.

201. The terminal device triggers the data volume report, where the data volume report indicates a data volume on the one path.

The data volume report may be a MAC layer message, for example, a buffer status report (BSR).

Optionally, when the first path and the second path belong to a same logical channel, the terminal device triggers one data volume report, and notifies the data volume on the one path via the one data volume report.

Optionally, when the first path and the second path are two different logical channels, respectively, and the two different logical channels belong to different logical channel groups, the terminal device triggers two data volume reports respectively corresponding to the two paths. Optionally, the terminal notifies the radio access network of the data volume on the one path via the data volume report corresponding to the one path. Optionally, after sending the data volume report corresponding to the one path, the terminal does not cancel a data volume report corresponding to the other path.

Optionally, when the first path and the second path are two different logical channels, and the two different logical channels belong to a same logical channel group, the terminal device triggers one data volume report, and notifies the data volume on the one path via the one data volume report.

It should be noted that a data volume on the first path includes a data volume on the one PDCP entity and a data volume on the first RLC entity within the current transmission time unit, and a data volume on the second path includes the data volume on the one PDCP entity and a data volume on the second RLC entity within the current transmission time unit.

In a possible implementation, there is an amount of data at a protocol layer above an RLC layer that has not been transmitted to an RLC entity within the current transmission time unit. In this case, each of the data volume on the first path and the data volume on the second path further include the amount of data that has not been transmitted to the RLC entity. For example, a service data adaptation protocol (SDAP) layer is further included above a PDCP protocol layer in a 5th generation mobile communications system. If there is a data volume on an SDAP entity corresponding to the PDCP entity within the current transmission time unit, each of the data volume on the first path and the data volume on the second path further include the data volume on the SDAP entity. For another example, for a signaling radio bearer, an RRC layer is further included above the RLC protocol layer. If there is a data volume on an RRC entity within the current transmission time unit, each of the data volume on the first path and the data volume on the second path further includes the data volume on the RRC entity.

In another possible implementation, the data volume report may not be capable of including data volumes on all paths having the data volumes. For example, a maximum quantity of paths for which data volumes may be indicated in the data volume report is set to N, but more than N paths have data volumes; or after the terminal device has completely allocated to-be-transmitted data, there is a remaining resource that can accommodate a padding BSR, but the remaining resource cannot accommodate padding BSRs and MAC subheaders that correspond to all of the paths having the data volumes. In this case, the terminal device determines, based on a priority of each path in respect of an air interface format corresponding to an uplink resource, paths for which data volumes may be indicated in the data volume report. For example, data volumes on N (1☐N<M) paths with highest priorities in all of the paths or N logical channel groups including paths with highest priorities are selected.

In the duplication mode, one PDCP entity corresponds to two RLC entities, and the two RLC entities may correspond to two logical channels, respectively. The radio access network may set a priority of one of the two logical channels to an infinitely low priority. In this way, when there are sufficient uplink resources, data volumes on the two logical channels may be reported in the data volume report; or when there are relatively strained or limited uplink resources, only a buffered data volume on a logical channel with a higher priority is reported.

Alternatively, priorities of the two logical channels may change, for example, change based on a buffered data volume. When a data volume on a logical channel 1 is greater than a data volume on a logical channel 2, the logical channel 1 has a normal priority, and a priority of the logical channel 2 is set to an infinitely low priority.

202. The terminal device sends the data volume report to the radio access network.

Optionally, before step 202, the method further includes:

receiving, by the terminal device, a second message sent by the radio access network, where the second message indicates a cell or a cell group corresponding to the first path and a cell or a cell group corresponding to the second path.

That the terminal device sends the data volume report to the radio access network specifically includes: The terminal sends the data volume report to the radio access network in a cell or a cell group corresponding to the one path, or the terminal device sends the data volume report to the radio access network in a cell or a cell group different from a cell or a cell group corresponding to the one path.

Optionally, when an RLC entity 1 on the first path and an RLC entity 2 on the second path respectively belong to two radio access devices, the terminal device sends, in the cell or the cell group corresponding to the one path, the data volume report to a radio access device to which the one path belongs.

Optionally, when an RLC entity 1 on the first path and an RLC entity 2 on the second path belong to one radio access device, the terminal device sends, in the cell or the cell group corresponding to the one path, the data volume report to the one radio access device.

Optionally, the terminal device determines whether there is a resource, for sending the data volume report, in the cell or the cell group corresponding to the one path. If there is no such resource in the cell or the cell group corresponding to the one path, the terminal device sends the data volume report via a semi-persistent resource in another cell or another cell group or a dynamic resource scheduled by the radio access network. Otherwise, the terminal sends the data volume report via the resource in the cell or the cell group corresponding to the one path.

Optionally, the semi-persistent resource in the another cell or the another cell group is a resource that is allocated by the radio access network to the terminal device at a time and that may be used by the terminal device for a plurality of times, for example, a periodic resource reserved for the terminal device.

Further, the radio access network may determine data transmission resources based on the data volume on the one path.

Because data on the second RLC entity is a duplicate of some or all of data transmitted from the PDCP entity to the first RLC entity, the radio access network may determine the data transmission resources in the radio bearer based on the data volume on the one path.

In a possible implementation, for one radio bearer, the radio access network multiplies the data volume on the one path by a quantity of all RLC entities corresponding to one PDCP entity in a duplication mode of the radio bearer, to learn of a to-be-transmitted data volume on the radio bearer. In this embodiment, the quantity of all the RLC entities corresponding to the one PDCP entity is 2. It should be noted that, because of complexity of a network environment, the data transmission resources in the radio bearer that are determined by the radio access network are not necessarily sufficient to ensure that the terminal device can send all to-be-transmitted data on the radio bearer.

If the terminal device has a plurality of radio bearers, the radio access network determines data transmission resources in each radio bearer. Total data transmission resources available to the terminal device are a sum of determined data transmission resources in all of the radio bearers.

By applying the technical solution provided in the first embodiment, the terminal device notifies the radio access network of a data volume on one of at least two paths in the duplication mode. This can reduce signaling overheads caused by notifying, by the terminal device, data volumes on all paths.

A second embodiment of this application provides a communication processing method, and relates to activation management of a duplication mode. The second embodiment may be based on an architecture, of the protocol stack of the wireless communications system, shown in any one of FIG. 1A, FIG. 1B to FIG. 1F, FIG. 1G and FIG. 1H. Optionally, because the second embodiment includes management of notifying, by a terminal device, a radio access network of a to-be-transmitted data volume when the duplication mode is activated, in activation management in the second embodiment, the first embodiment may be used as a possible implementation when a duplication mode on an uplink is activated.

Figure 3:
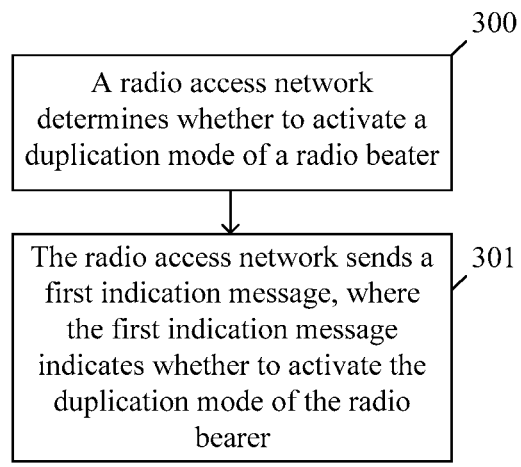
FIG. 3 is a schematic flowchart of communication processing according to an embodiment of this application.

Referring to a schematic flowchart of communication processing shown in FIG. 3, this embodiment of this application includes the following content.

300. The radio access network determines whether to activate a duplication mode of a radio bearer.

Optionally, the radio access network may separately determine whether to activate a duplication mode of the radio bearer on an uplink and a duplication mode of the radio bearer on a downlink.

Optionally, the radio access network measures channel quality of the uplink, and determines, based on the channel quality of the uplink, whether to activate the duplication mode of the radio bearer. If the channel quality is lower than a preset threshold, the radio access network determines to activate the duplication mode of the radio bearer on the uplink, so as to ensure stability of data transmission. Alternatively, if the terminal device has high-priority data to be sent on the radio bearer, the radio access network determines to activate the duplication mode of the radio bearer. Optionally, when the channel quality of the uplink is higher than a preset threshold, particularly when channel quality of a primary cell or a master cell group corresponding to a first path in an uplink carrier aggregation scenario is quite high, the radio access network may not activate (that is, deactivate) the duplication mode of the radio bearer.

Optionally, in a scenario in which the radio access network includes a CU and a DU, the CU may determine whether to activate the duplication mode, or the DU may determine whether to activate the duplication mode.

The CU or the DU may determine, based on cell load information or a measurement report of the terminal device on cell signal quality, whether to activate the duplication mode.

For example, when serving cell signal quality reported by the terminal device via a measurement report is lower than a specific threshold (for example, serving cell signal strength is lower than a specific threshold, serving cell channel quality is lower than a specific threshold, a ratio of HARQ negative acknowledgements exceeds a specific threshold, or a quantity of RLC retransmission times exceeds a specific threshold) or serving cell load is higher than a specific threshold, the CU or the DU determines that the duplication mode needs to be performed, so as to improve stability of data transmission. The CU or the DU may activate a duplication mode of at least one radio bearer of the terminal device, to improve stability of data transmission on the radio bearer. The CU or the DU further selects, based on signal quality of another cell in the measurement report of the UE or cell load of another cell, a cell in which data is duplicated on the radio bearer whose duplication mode is activated, for example, selects a cell having good cell signal quality or low load.

The measurement report reported by the terminal device to the CU or the DU may be a reference signal received power (RSRP) or reference signal received quality (RSRQ) measurement report or an RLC/MAC/PHY layer measurement report. The RSRP measurement or RSRQ measurement report is reported by the terminal device to the CU through an RRC layer; and the RLC/MAC/PHY layer measurement report may be a measurement report of the terminal device at a MAC layer that the CU requests the DU to send, for example, to send periodically or on an event-triggered basis, to the CU. When requesting, from the DU, the measurement report of the terminal at the RLC/MAC/PHY layer, the CU may notify the DU of which cell of which terminal the requested MAC layer measurement report is specific to. The CU may add, to a request, an identifier of a cell and a terminal identifier of the terminal device on a CU-DU interface. In response to the request of the CU, the DU sends the RLC/MAC/PHY layer measurement report of the terminal to the CU periodically or on an event-triggered basis.

Optionally, when the radio bearer is a signaling radio bearer, the CU notifies, via an RRC message, the DU of a signaling radio bearer whose duplication mode is activated and paths that respectively correspond to at least two pieces of duplicated signaling on the signaling radio bearer. When the CU duplicates a PDCP data packet and sends the RRC message through the CU-DU interface, the CU indicates an SRB type and a path identifier (for example, a logical channel identifier) that correspond to the RRC message, so that after obtaining the RRC message, the DU can transmit the RRC message to a path (or an RLC entity) corresponding to the path identifier in an SRB corresponding to the SRB type. On the uplink, a duplication mode of one SRB is activated, and the SRB includes one PDCP entity in the CU. Therefore, when sending an RRC message to the CU through the CU-DU interface, the DU indicates an SRB type corresponding to the RRC message, so that the CU learns of an SRB corresponding to a PDCP entity to which the RRC message is transmitted. In this case, the path identifier may not be indicated.

For example, the CU generates an RRC message 1, and the RRC message 1 is borne on a signaling radio bearer 1. After a duplication mode of the signaling radio bearer 1 is activated, the signaling radio bearer 1 includes two paths: a path 1 and a path 2.

In a possible implementation, the CU duplicates the RRC message 1 to obtain two RRC messages 1; adds the first RRC message 1 to a CU-DU interface message (for example, a first DL RRC transfer message) and indicates an SRB type and a path identifier 1 (e.g. a logical channel identifier 1); and adds the second RRC message 1 to another CU-DU interface message (for example, a second DL RRC transfer message) and indicates an SRB type and a path identifier 2 (e.g. a logical channel identifier 2).

In another possible implementation, the CU may add the two duplicated RRC messages 1 to one CU-DU interface message (for example, DL RRC transfer), and provide a corresponding SRB type and path identifier for each RRC message 1. Particularly, only one SRB type may be provided for RRC messages belonging to a same SRB, and the SRB type does not need to be indicated for each RRC message.

According to this implementation, for at least two pieces of same duplicated data, a plurality of pieces of same duplicated data are sequentially sent to at least two RLC entities corresponding to one PDCP entity.

In a possible example, a format in which one CU-DU interface message (for example, an F1 message) includes one downlink RRC transfer message is described in the following table.

| Information element name (IE/Group name) | Presence | Range | Information element type and reference (IE type and reference) | Semantics description |
|---|---|---|---|---|
| Message type | The message is mandatory. | | | |
| Terminal identifier on a CU-DU interface (DU-CU UE F1AP ID) | The message is optional. | | | |
| Cell identifier (Cell ID) | The message is mandatory. | | NCGI (new radio cell global identifier) | |
| SRB type | The message is mandatory. | | Bit string (BIT STRING (3)) | Each position in the bit string represents one SRB type: the first bit indicates an SRB1(S), the second bit indicates an SRB2(S), the third bit indicates an SRB3, and so on. |
| Path identifier | The message is optional. | | | When a duplication mode is activated, a path identifier, for example, a logical channel identifier, in the duplication mode is |

| Information element name (IE/Group name) | Presence | Range | Information element type and reference (IE type and reference) | Semantics description |
|---|---|---|---|---|
| RRC container | The message is mandatory. | | | provided. RRC message |

The RRC container includes the RRC message. The SRB type is the SRB, the SRB1, the SRB2, the SRB1S, the SRB2S, or the SRB3 corresponding to the RRC message. During configuration, the CU notifies the DU that an SRB1 of a terminal corresponds to a path identifier 1 and a path identifier 2. In this case, when the CU subsequently sends the RRC message on the CU-DU interface (which may be referred to as an F1 interface for short), the path identifier 1 and the path identifier 2 that correspond to the RRC message are carried.

In another possible example, a format in which one CU-DU interface message (for example, an F1 message) includes a plurality of downlink RRC transfer messages is described in the following table.

| Information element name (IE/Group name) | Presence | Range | Information element type and reference (IE type and reference) | Semantics description |
|---|---|---|---|---|
| Message type | The message is mandatory. | | | |
| Terminal identifier on a CU-DU interface (base station-CU UE F1AP ID) | The message is optional. | | | |
| RRC message list | | | | |
| Cell identifier (Cell ID) | The message is mandatory. | | NCGI | |
| SRB type | The message is mandatory. | | Bit string (BIT STRING (3)) | Each position in the bit string represents one SRB type: the first bit indicates an SRB1(S), the second bit indicates an SRB2(S), the third bit indicates an SRB3, and so on. |
| Path identifier | The message is optional. | | | When a duplication mode is activated, a path identifier, for example, a logical channel identifier, in the duplication mode is provided. |
| RRC container | The message is mandatory. | | | RRC message |

In an example, when the CU sends a duplicated PDCP data packet, an identifier of a path to which the PDCP data packet is to be transmitted is carried in a packet header of the PDCP data packet. Alternatively, a path identifier is carried in a packet header of a CU-DU interface message. For example, the interface message may be a user plane tunnel (e.g. GPRS tunneling protocol-user plane (GTP-U)) message.

In another example, the DU reads at least two received PDCP data packets, and determines numbers of the at least two PDCP data packets. The DU further determines that PDCP data packets with same a number in the at least two PDCP data packets are duplicated PDCP data on which a duplication mode is performed. The DU sends the determined duplicated PDCP data to different RLC entities corresponding to one PDCP entity, for duplication.

Optionally, in a scenario in which the CU includes a CU control plane and a CU user plane, the CU user plane duplicates a PDCP data packet, and the CU control plane may determine, based on cell signal quality or cell load information, whether to activate a duplication mode of a radio bearer, and notify the CU user plane whether the duplication mode of the radio bearer is activated. When the CU control plane sends an RRC message through an F1 interface, and the CU user plane sends user plane data through the F1 interface, the method in the foregoing table is used to indicate a path identifier corresponding to the RRC message or the user plane data, so that the DU sends the RRC message or the user plane data to an RLC entity corresponding to an SRB or a DRB.

Optionally, in a scenario in which the CU includes a CU control plane and a CU user plane, the CU user plane duplicates a PDCP data packet, and the DU may determine, based on cell signal quality or cell load information, whether to activate a duplication mode of a radio bearer, and notify the CU user plane whether the duplication mode of the radio bearer is activated. For specific details, refer to the foregoing method.

Optionally, the radio access network measures channel quality of the downlink, and determines, based on the channel quality of the downlink, whether to activate the duplication mode of the radio bearer. If the channel quality of the downlink is lower than a preset threshold, the radio access network determines to activate the duplication mode of the radio bearer on the downlink, so as to ensure stability of data transmission. Alternatively, if the radio access network has high-priority data to be sent on the radio bearer, the radio access network determines to activate the duplication mode of the radio bearer. Optionally, when the channel quality of the downlink is higher than a preset threshold, particularly when channel quality of a primary cell or a master cell group corresponding to a first path is quite high in a downlink carrier aggregation scenario, the radio access network may deactivate the duplication mode of the radio bearer on the downlink.

For duplication mode activation and deactivation, communication processing performed on the uplink is similar to that on the downlink. In the following, on the uplink, a transmit end is the terminal device, and a receive end is the radio access network; and on the downlink, a transmit end is the radio access network.

Optionally, if the duplication mode is activated, the transmit end may transmit data in the duplication mode. In this case, for one radio bearer, PDCP data on one PDCP entity in the radio bearer is transmitted to a corresponding first RLC entity on a first path, and is duplicately transmitted on a corresponding second RLC entity on a second path.

If the duplication mode is deactivated, the transmit end does not use the duplication mode to transmit data. In this case, for one radio bearer, a second RLC entity does not duplicate some or all of data that is on a first RLC entity. Optionally, to ensure that data can still be transmitted between the transmit end and the receive end when the duplication mode is deactivated, the radio access network may further instruct one of the first RLC entity and the second RLC entity to transmit data from a PDCP entity when the duplication mode is deactivated, and the other RLC entity no longer transmits any data from the PDCP entity, or the other RLC entity may transmit non-duplicated data from the PDCP entity (in this case, the one of the first RLC entity and the second RLC entity that correspond to the one PDCP entity may not be released, and there are still two paths for sending the non-duplicated data). Optionally, when the duplication mode on the uplink is deactivated, the one RLC entity is determined by the radio access network that serves as the receive end, or is selected by the terminal device that serves as the transmit end. When the duplication mode on the downlink is deactivated, the one RLC entity is determined by the radio access network that serves as the transmit end. Optionally, the one RLC entity is a primary RLC entity.

Optionally, in a single-radio access device carrier aggregation scenario, if the duplication mode is deactivated, data is transmitted on a path on which one of the first RLC entity and the second RLC entity is located, and the data is no longer transmitted on a path on which the other RLC entity is located. The duplication mode stops when a next transmission time unit after the transmit end confirms that the duplication mode is deactivated starts. If the transmit end is a radio access device, sending in the duplication mode stops when a next transmission time unit after the radio access device sends first indication information indicating that the duplication mode is deactivated starts. If the transmit end is the terminal device, sending in the duplication mode stops when a next transmission time unit after the terminal device receives first indication information indicating that the duplication mode is deactivated starts. In this case, the PDCP entity at the transmit end sends PDCP data to one RLC entity, and no longer sends duplicated PDCP data to another RLC entity, or sends duplicated PDCP data to another RLC entity but the another RLC entity does not receive the sent duplicated PDCP data. If there is before-deactivation duplicated data (data that has not been transmitted through an air interface or to-be-retransmitted data (which has been transmitted through an air interface but needs to be sent again)) in a buffer of the another RLC entity that has not been sent, the another RLC entity sends the before-deactivation duplicated data in the buffer, or the another RLC entity discards the duplicated data in the buffer, or sends the to-be-retransmitted data in the duplicated data in the buffer but discards the data that has not been transmitted through the air interface. The another RLC entity may discard the data by performing RLC reestablishment, for example, by stopping an RLC timer corresponding to the to-be-discarded data or by setting an RLC sending state variable of the to-be-discarded data to 0. According to this implementation, in the single-radio access device carrier aggregation scenario, if the duplication mode is deactivated, particularly when channel quality of a path becomes poor, duplicated data at an RLC layer is discarded, thereby reducing signaling overheads.

Optionally, in a dual connectivity scenario, if the duplication mode is deactivated, on the downlink, a primary radio access device on which a primary RLC entity is located and a secondary radio access device on which a secondary RLC entity is located do not send duplicated data to the terminal device, but send non-duplicated data to the terminal.

Optionally, in a dual connectivity scenario, if the duplication mode is deactivated, on the uplink, the terminal device sends non-duplicated data to both a primary base station and a secondary base station, but no longer sends duplicated data to the primary base station and the secondary base station. Optionally, when the duplication mode of the radio bearer is deactivated, the terminal device may select a path from a first path and a second path in the radio bearer, as a deactivated path, or the radio access device determines a deactivated path from a first path and a second path in the radio bearer. Optionally, the deactivated path is disabled, or is prohibited from sending the duplicated data but can send the non-duplicated data. Optionally, if a transmit-end PDCP entity has sent the duplicated data to an RLC entity corresponding to the deactivated path, the transmit-end RLC entity discards the duplicated data; or a transmit-end PDCP entity does not transmit any data to a transmit-end RLC entity corresponding to the deactivated path. Correspondingly, a receive-end RLC entity corresponding to the deactivated path discards data from a MAC layer, or a receive-end MAC layer does not send any data to an RLC entity corresponding to the deactivated path. For example, in a carrier aggregation scenario, if the first path corresponds to a primary cell or a master cell group, the second path is deactivated, and a second RLC entity on the second path no longer duplicates data transmitted on a first RLC entity. If the second path corresponds to a primary cell or a master cell group, the first path is deactivated, and a first RLC entity on the first path no longer duplicates data transmitted on a second RLC entity. In a possible implementation, in a dual connectivity scenario, both a primary radio access device and a secondary radio access device provide communication services for the terminal device. For one radio bearer, two RLC entities corresponding to one PDCP entity are respectively located on the primary radio access device and the secondary radio access device. In a non-CU-DU networking scenario, the PDCP entity may be located on the primary radio access device, or may be located on the secondary radio access device. In a CU-DU networking scenario, the PDCP entity is located on a CU, and two DUs on which the two RLC entities corresponding to the PDCP entity are located are the primary radio access device and the secondary radio access device.

In this possible implementation, when a duplication mode of the radio bearer is activated, duplicated data is transmitted on the primary radio access device and the secondary radio access device.

301. The radio access network sends a first indication message to the terminal device, where the first indication message is used to indicate whether to activate the duplication mode of the radio bearer.

The first indication message may a MAC layer message or an RRC layer message. Optionally, the radio access network may further notify an effective time of the first indication message. The effective time is used to indicate when the duplication mode indicated in the first indication message takes effect, or duration for which the duplication mode is effective. In the CU-DU networking scenario, the first indication message and the effective time may be notified by the CU to the DU. For example, the DU sends, based on an indication of the effective time, the MAC layer message to instruct the terminal to activate the duplication mode. Alternatively, when the effective time indicates the duration for which the duplication mode is effective, and the DU may find, based on the duration, that the duplication mode is to be ineffective, the DU instructs, via the MAC layer message, the terminal device to deactivate the duplication mode. The first indication message and the effective message may be alternatively generated by the DU and sent to the CU. When the first indication message is generated by the CU, the first indication message is sent by the CU to the DU, and then the DU sends the first indication message to the terminal device via the MAC layer message. The effective time may be alternatively sent to the UE through the DU, so that the UE performs processing, for example, makes the duplication mode effective at a specified time, and stops the duplication mode when the effective time is counted down to 0.

Optionally, the radio access device may further notify the terminal device that the first indication message is specific to the uplink or the downlink.

Optionally, if the first indication message indicates that the duplication mode is deactivated, uplink duplicated data is no longer transmitted on at least two paths corresponding to one PDCP entity of the terminal device, but uplink non-duplicated data is sent on the at least two paths. For example, the uplink non-duplicated data or a data volume report indicating a data volume is sent on at least one path. Optionally, when the data volume is less than a threshold, the terminal device sends the uplink non-duplicated data on one of the at least one path; or when the data volume is greater than or equal to a threshold, the terminal device sends the uplink non-duplicated data on all of the at least one path. Optionally, when the data volume is less than a threshold, the terminal device sends the data volume report on one of the at least one path; or when the data volume is greater than or equal to a threshold, the terminal device sends the data volume report on all of the at least one path.

The one of the at least one path is indicated by the radio access network, or is predefined in a protocol, for example, predefined as the first path.

Optionally, in a dual connectivity scenario, if a radio access device (a primary radio access device or a secondary radio access device) in the radio access network sends a first indication message to the terminal device, the radio access device that sends the first indication message notifies another radio access device whether the duplication mode is activated or deactivated, so that when the duplication mode is deactivated, the another radio access device reestablishes RLC.

Optionally, in a dual connectivity scenario, when the duplication mode is deactivated, the radio access network may configure which radio access device is used for continuing to transmit data on a path on which the radio access device is located, and the other radio access device stops transmitting the duplicated data.

Optionally, in a dual connectivity scenario, if the terminal device and the radio access network transmit, before the duplication mode is activated, data to each other on a path on which a primary radio access device is located, after the duplication mode switches from an activated state to a deactivated state, the terminal device and the radio access network transmit data to each other on the path on which the primary radio access device is located (optionally, duplicated data in a HARQ buffer stops to be sent or is directly discarded after duplicated data that is already in the HARQ buffer continues to be sent on a path on which a secondary radio access device is located). Similarly, if the terminal device and the radio access network transmit, before the duplication mode is activated, data to each other on a path on which a secondary radio access device is located, after the duplication mode switches from an activated state to a deactivated state, the terminal device and the radio access network transmit data to each other on a path on which a primary radio access device is located (optionally, duplicated data in a HARQ buffer stops to be sent or is directly discarded after duplicated data that is already in the HARQ buffer continues to be sent on a path on which a primary radio access device is located).

To ensure that the terminal device can effectively receive the first indication message, the first indication message may have one of the following message structures.

In a possible implementation, in a schematic diagram of a message structure shown in FIG. 4, the first indication message includes a first field and a second field, the first field indicates that the first indication message is a control message for the duplication mode, and the second field indicates whether to activate the duplication mode. The first field may be a set of binary bits including at least one bit, and the second field may occupy one bit and indicate, via a bit state of the one bit, whether to activate the duplication mode. Optionally, the first field and the second field are included in a subheader of the MAC message.

Optionally, in a schematic diagram of a message structure shown in FIG. 5, the first indication message further includes a third field, and the third field indicates the radio bearer corresponding to the duplication mode. The third field may be specifically a radio bearer identifier. If only one radio bearer in the duplication mode is configured for the terminal device, the first indication message does not need to include the third field, and the terminal device can learn, without the third field, whether the duplication mode of the radio bearer is activated. If at least two radio bearers are configured for the terminal device, the terminal device may learn, via the second field and the third field in the first indication message, whether a duplication mode of each radio bearer is activated. Optionally, positions, corresponding to all the radio bearers, in the entire first indication message may be arranged based on values of identifiers of all the radio bearers.

Figure 6:
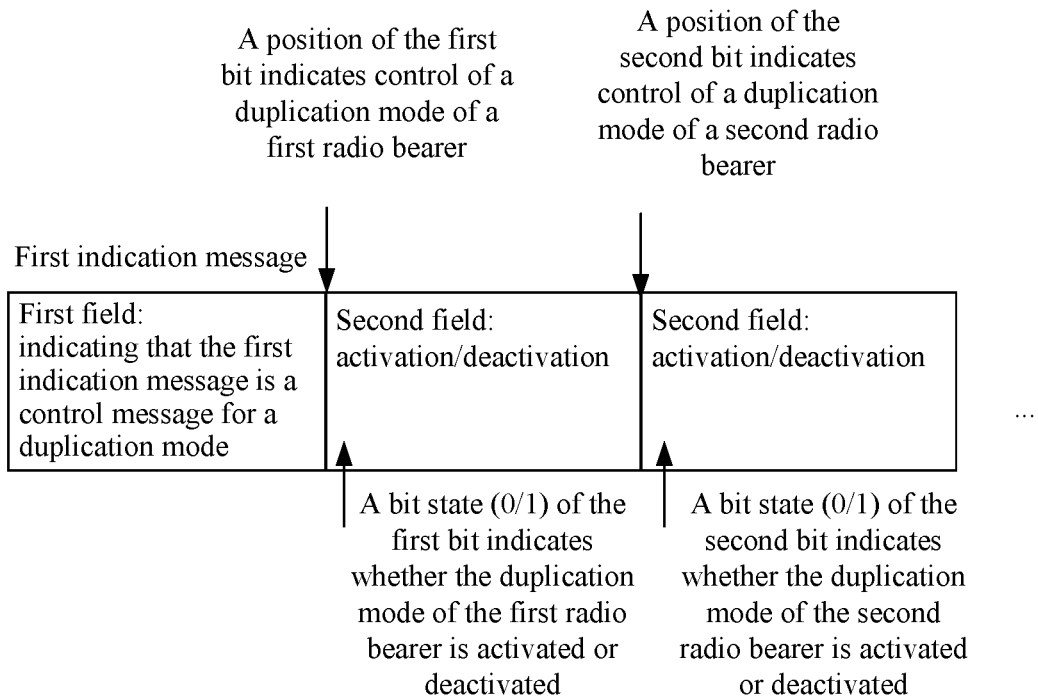

Optionally, in a schematic diagram of a message structure shown in FIG. 6, when at least two radio bearers are configured for the terminal device, a second field in the first indication message indicates, via a bit position of a certain bit, a radio bearer corresponding to a duplication mode, and indicates, via a bit state of the bit, whether to activate the duplication mode of the radio bearer. For example, a position of the first bit in the second field indicates a radio bearer 1, and a bit state of the first bit indicates whether a duplication mode of the radio bearer 1 is activated; and a position of the second bit in the second field indicates a radio bearer 2, and a bit state of the second bit indicates whether a duplication mode of the radio bearer 2 is activated. Optionally, positions, corresponding to all the radio bearers, in the entire first indication message may be arranged based on values of identifiers of all the radio bearers.

Optionally, in FIG. 6, a quantity of bits in the second field in the first indication message is a preset value, for example, a maximum quantity of identifiers of radio bearers or a maximum quantity of radio bearers that can be supported by the terminal device. Each radio bearer corresponds to one bit position, and the radio bearers may be arranged in ascending order or descending order of the values of the identifiers of the radio bearers. Some radio bearers may support the duplication mode (therefore, there is a case of whether the duplication mode is activated), and some radio bearers may not support the duplication mode. Optionally, the quantity of bits in the second field is a multiple of 8, for example, 32 bits, so that a message format is in a unit of an integral multiple of bytes. For example, if the terminal device can support a maximum of 32 radio bearers, the quantity of bits in the second field is 32, and each radio bearer corresponds to one bit position. In an actual communication process, two of the 32 radio bearers configured for the terminal device support the duplication mode, for example, the radio bearer 1 and the radio bearer 2. When receiving the first indication message, the terminal device detects states of bits in corresponding bit positions on the radio bearer 1 and the radio bearer 2, and thereby can learn whether the duplication mode of the radio bearer 1 and the duplication mode of the radio bearer 2 are activated. Because a radio bearer 3 to a radio bearer 32 are not configured for the terminal device or may not support a duplication mode during actual communication, the terminal device ignores states, in the first indication message, of bits in bit positions corresponding to the radio bearer 3 to the radio bearer 32.

Optionally, assuming that X radio bearers (for example, radio bearers 1, 3, and 5) are configured for the terminal device, the radio access network sets, based on an identifier value of a radio bearer, that bit states of the first X bits or the last X bits in the second field in the first indication message correspond to whether duplication modes of the X radio bearers are activated (for example, the first bit corresponds to the radio bearer 1, the second bit corresponds to the radio bearer 3, and the third bit corresponds to the radio bearer 5), and the terminal device reads the first X bits or the last X bits in the second field in the first indication message to learn whether the duplication modes of the X radio bearers are activated, and ignores other bits included in the second field.

Optionally, at least two radio access devices in the radio access network provide communication services for the terminal device by establishing a plurality of radio bearers (for example, in the dual connectivity scenario). Some radio bearers span radio access devices (for example, in one radio bearer, a PDCP entity and a first RLC entity are located on a radio access device A, and a second RLC entity is located on a radio access device B), and some radio bearers do not span the radio access devices (for example, in one radio bearer, a PDCP entity, a first RLC entity, and a second RLC entity are all located on a radio access device A). In this case, a radio access device knows radio bearers established on the radio access device, but does not know radio bearers on other radio access devices serving a same terminal.

In an implementation, each radio access device sends a first indication message to the terminal device, and each first indication message indicates whether a duplication mode of a radio bearer on each radio access device is activated. For example, a first indication message sent by a radio access device A indicates whether a duplication mode of at least one radio bearer on the radio access device A is activated, and a first indication message sent by a radio access device B indicates whether a duplication mode of at least one radio bearer on the radio access device B is activated. The radio access device A arranges all radio bearers on the radio access device A based on identifier values (1, 3, and 5), and sets bit states of the first X bits or the last X bits in a second field based on the identifier values of the radio bearers on the radio access device A. The radio access device B arranges all radio bearers on the radio access device B based on identifier values (2, 4, and 5), and sets bit states of the first X bits or the last X bits in a second field based on the identifier values of the radio bearers on the radio access device B.

In another implementation, these radio access devices may make, through notification and negotiation, positions of all bits in a second field in one first indication message correspond to all radio bearers, and one radio access device sends the first indication message to the terminal device. In this case, the first indication message indicates whether duplication modes of the radio bearers on all of the radio access devices are activated. For example, radio bearers on the radio access device A may be placed on the first several bits in the second field in the first indication message, and positions of bits corresponding to the radio bearers are arranged among the first several bits based on identifier values of the radio bearers on the radio access device A; and radio bearers on the radio access device B may be placed on the last several bits in the second field, and positions of bits corresponding to the radio bearers are arranged among the last several bits based on identifier values of the radio bearers on the radio access device B. For another example, all radio bearers that can be supported by the terminal device may be arranged in the first indication message based on identifier values; the radio access network sets, based on the identifier values of all the radio bearers, that bit states of the first X (an integer greater than or equal to 1) bits or the last X bits in the second field in the first indication message correspond to whether duplication modes of the X radio bearers currently configured for the terminal are activated; and one radio access device sends the first indication message to the terminal device. In this case, the first indication message indicates whether the duplication modes of the currently configured radio bearers are activated.

Figure 7:
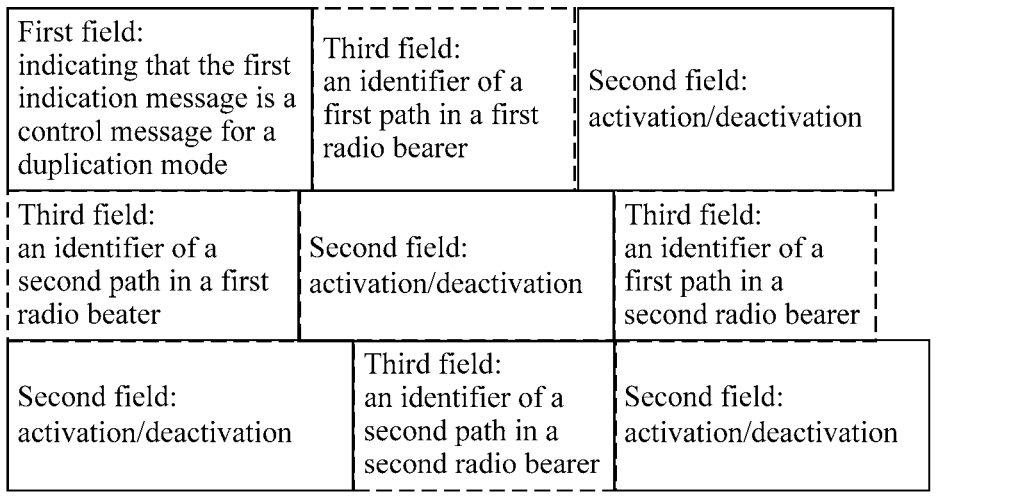

Optionally, the radio access network may notify the terminal device of a correspondence between a bit position in the second field in the first indication message and a radio bearer, so that the terminal learns a certain bit corresponds to a radio bearer. The terminal detects a state of a bit whose bit position corresponds to a radio bearer configured for communication, to learn whether a duplication mode of the configured radio bearer is activated. In another possible implementation, in a schematic diagram of a message structure shown in FIG. 7, the first indication message includes a first field and a second field, the first field indicates that the first indication message is a control message for the duplication mode, and the second field indicates whether the first path and the second path are activated. Optionally, the second field includes two bits: One bit indicates whether the first path is activated, and the other bit indicates whether the second path is activated. When both the first path and the second path are activated, the duplication mode is activated. When at least one of the first path and the second path is deactivated, the duplication mode is deactivated, or the first indication message is an invalid message. If the first indication message is the invalid message, the terminal device discards the first indication message. Optionally, the first indication message may include a third field, and the third field indicates identifiers of the first path and the second path or an identifier of a radio bearer in the duplication mode. Optionally, positions, corresponding to all paths, in the entire first indication message may be arranged based on identifier values of all the paths.

Figure 8:
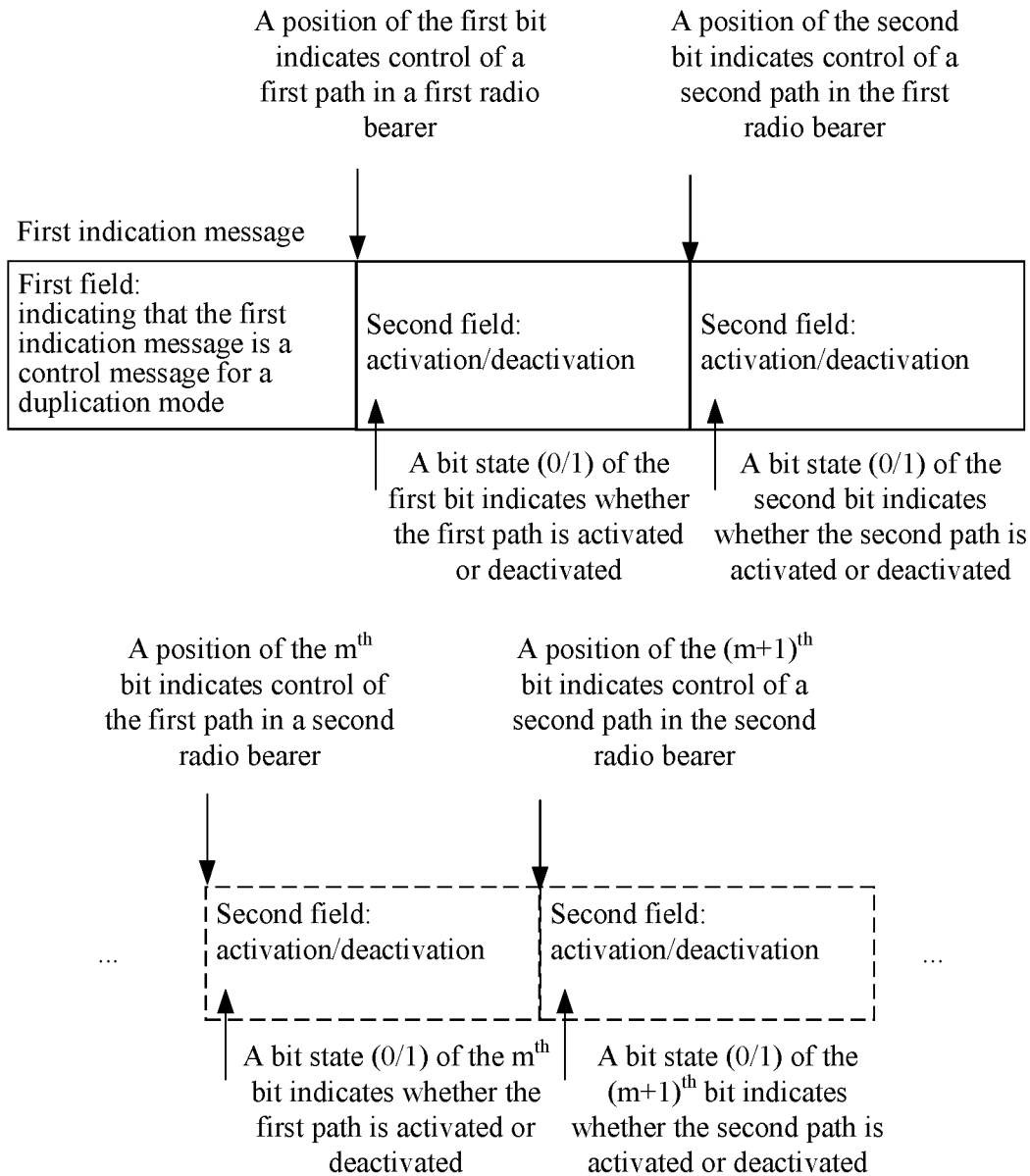

Optionally, in a diagram of a message structure shown in FIG. 8, a second field in the first indication message indicates the first path via a position of the first bit, and indicates, via a bit state of the first bit, whether the first path is activated; and indicates the second path via a position of the second bit, and indicates, via a bit state of the second bit, whether the second path is activated. In this manner, one bit can not only indicate one path but also indicate whether the path is activated. Optionally, positions, corresponding to all paths, in the entire first indication message may be arranged based on identifier values of all the paths.

Figure 9:
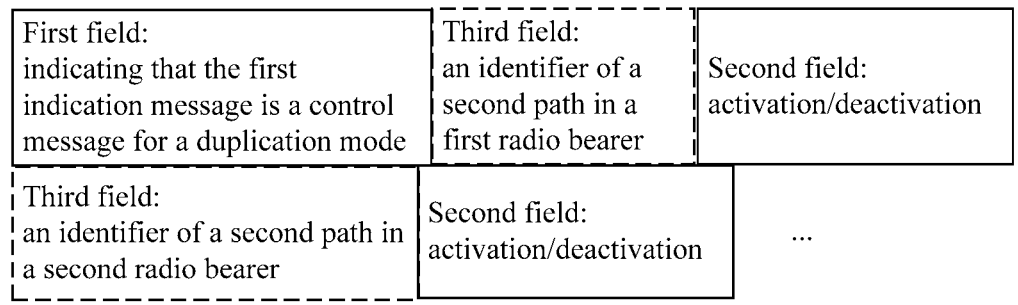

In another possible implementation, assuming that the first path is always activated, the first indication message may indicate whether the second path is activated, so as to indicate whether a duplication mode of a radio bearer is activated. In a diagram of a message structure shown in FIG. 9, the first indication message includes a first field and a second field, the first field indicates that the first indication message is a control message for the duplication mode, and the second field indicates whether the second path is activated. In this case, when the second path is activated, the duplication mode is activated, or when the second path is deactivated, the duplication mode is deactivated. Optionally, the first indication message further includes a third field, and the third field indicates an identifier of the second path. Optionally, in this possible implementation, the cell or the cell group corresponding to the first path is a primary cell or a master cell group, or a path identifier of the first path is less than a path identifier of the second path.

Figure 10:
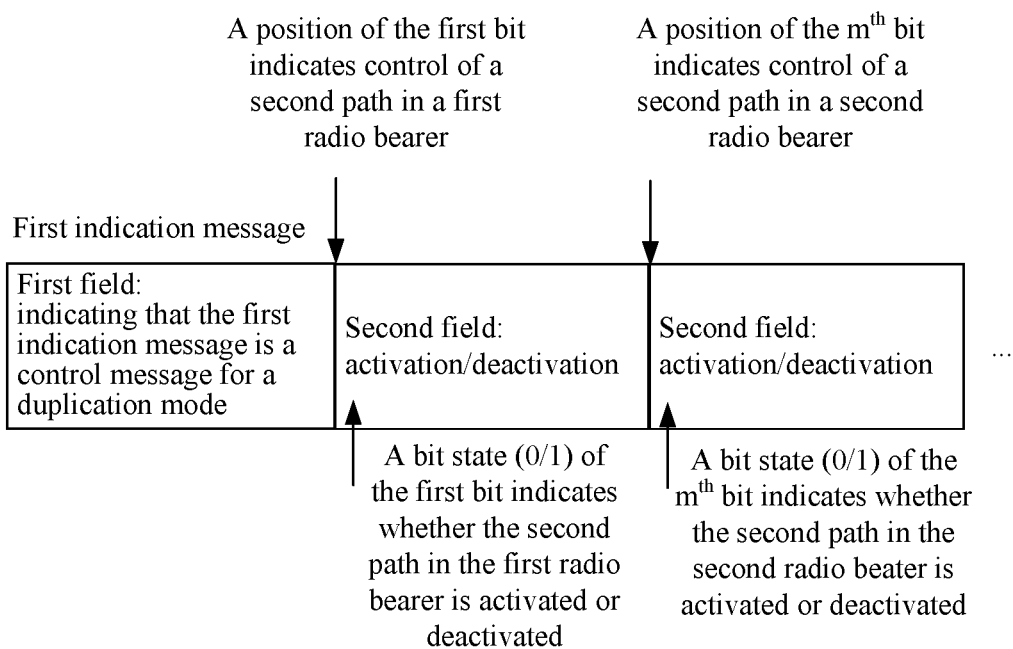

Optionally, in a diagram of a message structure shown in FIG. 10, a second field in the first indication message indicates the second path via a position of the first bit, and indicates, via a bit state of the first bit, whether the second path is activated; and indicates the second path via a position of the second bit, and indicates, via a bit state of the second bit, whether the second path is activated. In this manner, one bit can not only indicate one path but also indicate whether the path is activated. Optionally, positions, corresponding to all paths, in the entire first indication message may be arranged based on identifier values of all the paths.

In another possible implementation, the first indication message includes a first field and a second field, the first field indicates that the first indication message is a control message for the duplication mode, and the second field indicates whether the duplication mode is activated. If the first indication message is from the cell or the cell group corresponding to the first path, the second field controls whether the first path is activated; or if the first indication message is from the cell or the cell group corresponding to the second path, the second field controls whether the second path is activated. When both the first path and the second path are activated, the duplication mode is activated. When one of the first path and the second path is deactivated, the duplication mode is deactivated. Optionally, positions, corresponding to all paths, in the entire first indication message may be arranged based on identifier values of all the paths.

If the cells or the cell groups corresponding to the first path and the second path belong to one DU in the radio access network, in step 301, the DU or a CU corresponding to the DU generates the first indication message, and the DU sends the first indication message, to indicate whether the duplication mode is activated.

If the cells or the cell groups corresponding to the first path and the second path belong to two different DUs corresponding to one CU in the radio access network, in step 301, the two different DUs may respectively indicate, via the cells or the cell groups corresponding to the first path and the second path, whether the first path and the second path are activated, via the first indication message. Alternatively, in a dual connectivity scenario of carrier aggregation, one of the two different DUs indicates, via the first indication message, whether the first path and the second path are activated. Optionally, the first indication message may be control plane signaling or user plane indication information. The user plane indication information and the duplicated data may be sent simultaneously.

If the cells or the cell groups corresponding to the first path and the second path belong to two different DUs corresponding to different CUs in the radio access network, in step 301, the two different DUs may respectively indicate, via the first indication message and via the cells or the cell groups corresponding to the first path and the second path, whether the first path and the second path are activated. Alternatively, in a dual connectivity scenario of carrier aggregation, one of the two different DUs indicates, via the first indication message, whether the first path and the second path are activated.

If the radio access network is not divided into a CU and a DU based on protocol layers, and the cells or the cell groups corresponding to the first path and the second path belong to two different radio access devices in the radio access network, in step 301, the two different radio access devices may respectively indicate, via the first indication message and via the cells or the cell groups corresponding to the first path and the second path, whether the first path and the second path are activated. Alternatively, in a dual connectivity scenario of carrier aggregation, one of the two different radio access devices indicates, via the first indication message, whether the first path and the second path are activated.

According to the technical solution provided in step 300 and step 301, the terminal device can learn whether a duplication mode of a radio bearer on at least one of the uplink and the downlink is activated.

Based on the technical solution provided in step 300 and step 301, for the downlink or the uplink, regardless of whether the duplication mode is activated, one of all paths corresponding to one PDCP entity at the transmit end meets a trigger condition of a radio link failure, but at least one path can still be used to transmit data. In this case, the transmit end determines that there is no need to trigger the radio link failure of the path, or even if the radio link failure of the path is triggered, the transmit end does not reestablish a radio link to the receive end on the path. Optionally, when all paths corresponding to one PDCP entity meet a trigger condition of a radio link failure, the transmit end triggers the radio link failure. Optionally, for the uplink, the terminal device serving as the transmit end notifies the radio access network that the radio link failure occurs. Particularly, when the radio bearer is a signaling radio bearer, radio link reestablishment is triggered only when the radio link failure is detected on all of the paths corresponding to the one PDCP entity in the signaling radio bearer; otherwise, the radio link failure is not triggered.

Based on the technical solution provided in step 300 and step 301, for the downlink or the uplink, in a carrier aggregation scenario, regardless of whether the duplication mode is activated, a radio link failure can be triggered for a path on which a primary RLC entity at the transmit end is located, and a radio link failure cannot be triggered for a path on which a secondary RLC entity at the transmit end is located. For example, a maximum quantity of RLC retransmission times that is set by the secondary RLC entity is set to an infinite value, or a quantity of RLC retransmission times is not counted. Alternatively, even if a radio link failure can be triggered for a path on which a secondary RLC entity is located, radio link reestablishment is not performed.

When a quantity of retransmission times of the duplicated data on the second RLC entity reaches the maximum quantity of RLC retransmission times, communication quality cannot be ensured in the cell or the cell group corresponding to the second path. However, the first path on which the first RLC entity is located can still transmit data. This can ensure continuous data transmission, and avoid a data interruption problem caused by radio link reestablishment.

Optionally, for the uplink or the downlink, when the duplication mode is deactivated, the foregoing method further includes at least one of the following:

determining, by the transmit end, not to duplicate, on the second RLC entity, the data on the PDCP entity that is transmitted to the first RLC entity;

discarding, by the transmit end, duplicated data on the second RLC entity;

discarding, by the transmit end, all duplicated data at a MAC layer that is from the second RLC entity, or discarding duplicated data at a MAC layer that is from the second RLC entity and that is not stored into a HARQ buffer;

determining, by the transmit end, duplicated data on the second RLC entity that does not need to be transmitted through an air interface, and if the determined duplicated data on the second RLC entity has started to be transmitted through the air interface, continuing to transmit, by the transmit end, the determined duplicated data on the second RLC entity; and transmitting, by the transmit end, data that is from the PDCP entity and that is not a duplicate of the data on the first RLC entity.

Optionally, when the duplication mode is deactivated, if the second RLC entity no longer sends any data, the transmit end may further release a resource occupied by the second RLC entity.

In an extended possible implementation, when the duplication mode switches from the deactivated state to the activated state, the method further includes at least one of the following possible implementations.

Figure 11:
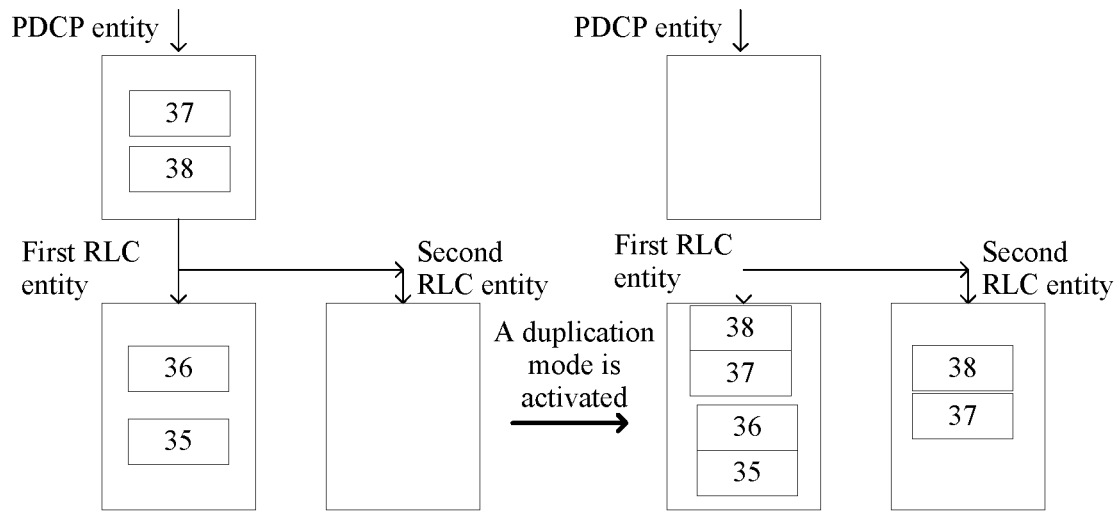
FIG. 11 to FIG. 13 are schematic diagrams of data transmission in a duplication mode according to an embodiment of this application.

If there is data on a transmit-end PDCP entity, the transmit end transmits the data on the PDCP entity to the first RLC entity, and duplicates, onto the second RLC entity, the data transmitted to the first RLC entity. In a schematic diagram of data transmission shown in FIG. 11, before the duplication mode is activated, data 37 and data 38 on the PDCP entity are to be transmitted, data 35 and data 36 on the first RLC entity are to be transmitted, and there is no data on the second RLC entity. After the duplication mode is activated, the transmit end transmits the data 37 and the data 38 on the PDCP entity to the first RLC entity, and duplicates the data 37 and the data 38 onto the second RLC entity.

Figure 12:
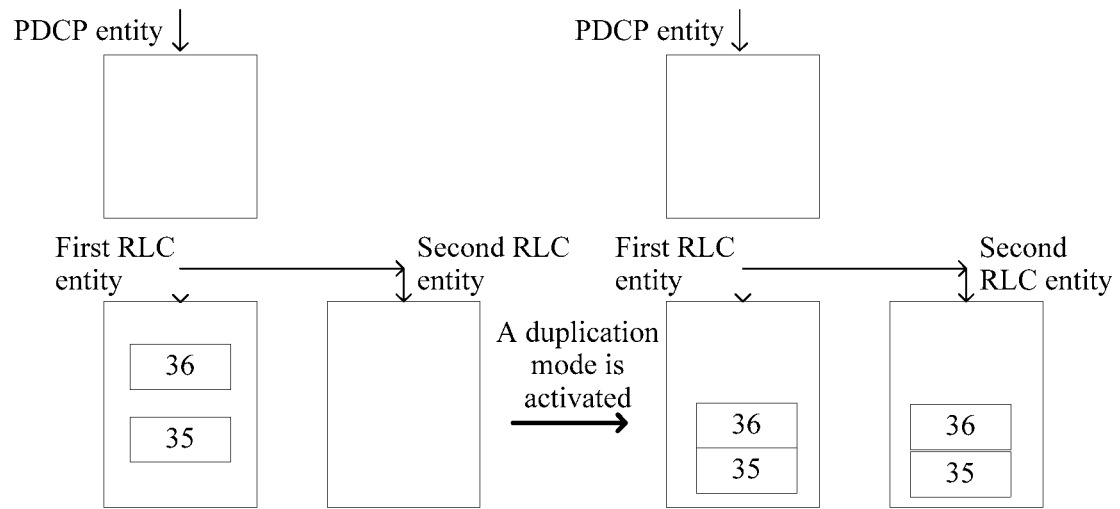

If there is data on the first RLC entity, the terminal device duplicates some or all of the data on the first RLC entity onto the second RLC entity. A part of data that is already on the first RLC entity before a current transmission time unit may not be duplicately transmitted onto the second RLC entity. In a schematic diagram of data transmission shown in FIG. 12, before the duplication mode is activated, data 35 and data 36 on the first RLC entity are to be transmitted. After the duplication mode is activated, the data 35 and the data 36 on the first RLC entity are duplicately transmitted onto the second RLC entity.

Figure 13:
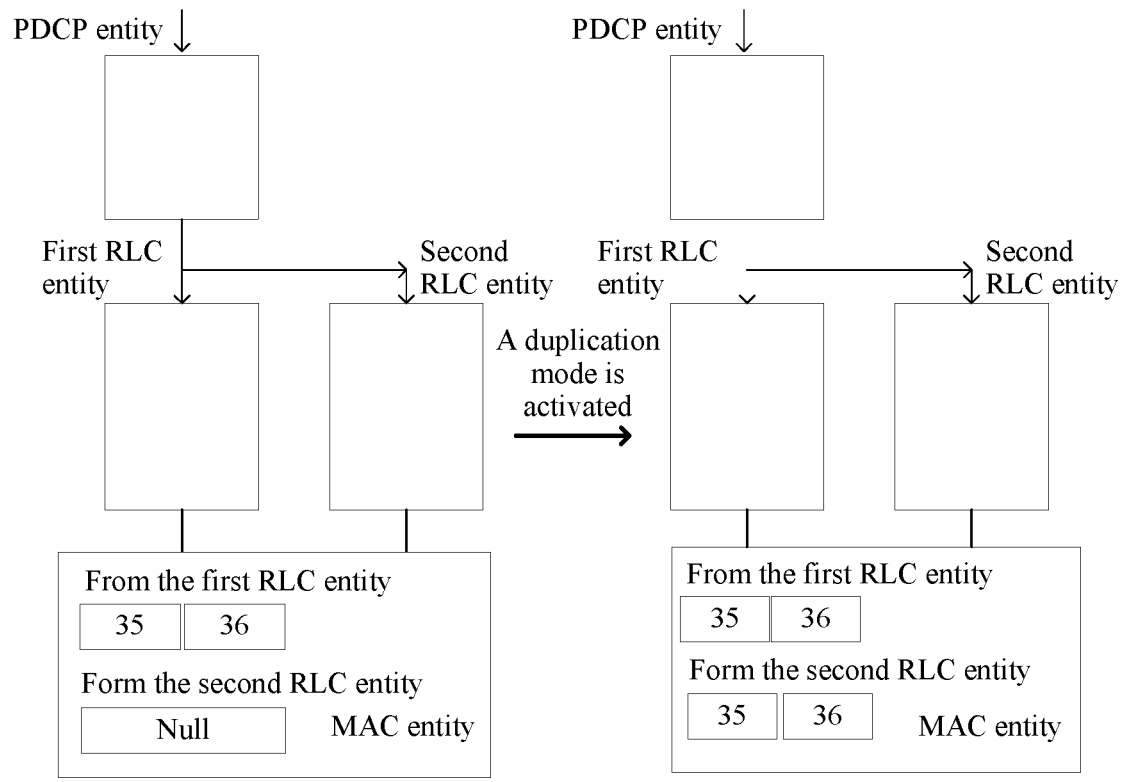

If there is data on the first RLC entity, the terminal device transmits some or all of the data on the first RLC entity to a MAC layer, duplicates the data at the MAC layer, and indicates that the duplicated data is from a second path. In other words, although the duplicated data is not from the second RLC entity, the MAC layer still indicates that the duplicated data is from the second RLC entity on the second path. In this case, when the data is duplicated at the MAC layer, indicating that the duplicated data is from the second RLC entity is equivalent to that the second RLC entity duplicates some or all of the data that is on the first RLC entity. In a schematic diagram of data transmission shown in FIG. 13, before a duplication mode is activated, data 35 and data 36 on the first RLC entity have been transmitted to the MAC layer, and the second RLC entity does not duplicate the data 35 and the data 36; and after the duplication mode is activated, the MAC layer duplicates the data 35 and the data 36, and indicates that the duplicated data 35 and the duplicated data 36 are from a second path, that is, are transmitted from the second RLC entity on the second path. The MAC layer sends the data 35 and the data 36 from the first RLC entity to a primary cell or a master cell group corresponding to a first path, and sends the duplicated data 35 and the duplicated data 36 to a secondary cell or a secondary cell group corresponding to the second path.

In an extended possible implementation, particularly for duplication mode management on the uplink, the transmit end is the terminal device, and the receive end is the radio access network. The method further includes the following content.

In an implementation, 302'. If the first indication message indicates that the duplication mode is deactivated, the terminal device cancels a data volume report that has been triggered for the second path. Optionally, the terminal device is configured by the radio access network to cancel, upon receiving the first indication message indicating that the duplication mode is deactivated, the data volume report that has been triggered for the second path.

In an alternative implementation of step 302', 302. The terminal device triggers the data volume report based on the first indication message.

The data volume report may be the MAC layer message, for example, a BSR.

When the first indication message indicates that the duplication mode of the radio bearer is activated, a data volume indicated in the data volume report may include data volumes on the first path and the second path, or may include a data volume on one of the first path and the second path, as described in step 201 in the foregoing method embodiment.

Optionally, when the data volume indicated in the data volume report includes the data volumes on the first path and the second path, a data volume on one of the first path and the second path may be 0. If there is a resource in the cell or the cell group corresponding to the first path, the data volume report is sent in the cell or the cell group corresponding to the first path. If there is a resource in the cell or the cell group corresponding to the second path, the data volume report is also sent in the cell or the cell group corresponding to the second path. Optionally, after the data volume report is sent on both the first path and the second path, the terminal device cancels the data volume report. If a resource in the second path is used to send the data volume report. If there is no resource in the cell or the cell group corresponding to the one path, the terminal device sends the data volume report via a semi-persistent resource in another cell or another cell group. Otherwise, the terminal sends the data volume report via the resource in the cell or the cell group corresponding to the one path.

When the first indication message indicates that a duplication mode of a radio bearer is deactivated, a second RLC entity on a second path in the radio bearer does not perform duplication. In this case, the data volume indicated in the data volume report includes a data volume on a first path in the radio bearer.

When the duplication mode of the radio bearer is deactivated, duplicated data is no longer transmitted on the second path, but data that is from the PDCP entity and that is not a duplicate of the data on the first RLC entity may be transmitted on the second path. In this case, when the terminal device determines that there is still to-be-sent data on the second RLC entity, the data volume indicated in the data volume report further includes a data volume of the non-duplicated data on the second path.

When the duplication mode of the radio bearer is activated, same data on the radio bearer may be transmitted on both the first path and the second path respectively corresponding to the first RLC entity and the second RLC entity in the radio bearer, so as to improve stability of data transmission. When the duplication mode of the radio bearer is deactivated, the second path in the radio bearer transmits data (that is, non-duplicated data) different from the data on the first RLC entity, so as to improve efficiency of data transmission. Certainly, when the duplication mode of the radio bearer is deactivated, the second path in the radio bearer may alternatively no longer transmit any data, until the first indication message sent by the radio access network indicates that the duplication mode is activated.

In a possible implementation, the terminal device triggers the data volume report immediately after receiving the first indication message (regardless of an indication of whether the duplication mode is activated in the first indication message). Optionally, the terminal device is configured by the radio access network to trigger the data volume report immediately after receiving the first indication message.

In a possible implementation, when the first indication message indicates that the duplication mode is activated, the terminal device further determines whether there is data on at least one of the PDCP entity and the first RLC entity, and if yes, the terminal device triggers the data volume report.

Optionally, based on step 302, the method in the second embodiment further includes the following steps.

303. The terminal device sends the data volume report to the radio access network when there is a resource for sending the data volume report.

304. The radio access network allocates data transmission resources to the terminal device based on the data volume indicated in the data volume report.

305. The terminal device sends data to the radio access network based on the data transmission resources.

In step 304 and step 305, the radio access network may indicate, in the allocated data transmission resources, a resource allocated to the cell or the cell group corresponding to the first path and a resource allocated to the cell or the cell group corresponding to the second path.

306. The radio access network receives, on the data transmission resources, the data sent by the terminal device.

In step 306, if receiving the data from the cell or the cell group corresponding to the first path, the radio access network delivers the received data to the first RLC entity in the radio access network for processing; or if receiving the data from the cell or the cell group corresponding to the second path, the radio access network delivers the received data to the second RLC entity in the radio access network for processing. The first RLC entity and the second RLC entity converge the processed data on one PDCP entity.

According to the technical solution provided in the second embodiment, the transmit end and the receive end may perform communication processing based on a status of whether the duplication modes on the uplink and the downlink are activated, so as to implement management when the duplication modes on the uplink and the downlink are activated or deactivated.

A third embodiment of this application provides a communication processing method, and the third embodiment relates to a configuration management method for a duplication mode on an uplink or a downlink. Optionally, this method may be combined with the solution in the second embodiment, and the configuration management method provided in the third embodiment is applied before the activation management method in the second embodiment. The third embodiment may be based on the architecture, of the protocol stack of the wireless communications system, shown in any one of FIG. 1A, and FIG. 1B to FIG. 1F. Referring to a schematic flowchart of the communication processing method shown in FIG. 4, the method includes the following content.

400. A radio access network determines configuration information of a duplication mode.

The configuration information may be a configuration of the duplication mode of a radio bearer on the uplink or the downlink.

401. A terminal device receives the configuration information sent by the radio access network.

Optionally, the configuration information indicates a cell or a cell group corresponding to a first path and a cell or a cell group corresponding to a second path. Optionally, for the uplink, the terminal device may send, based on the configuration information, data on the first path to the radio access network through the cell or the cell group corresponding to the first path or data on the second path to the radio access network through the cell or the cell group corresponding to the second path.

Optionally, for the downlink, based on the configuration information, the terminal device receives, from the cell or the cell group corresponding to the first path, data sent by the radio access network through the cell or the cell group corresponding to the first path, or receives, from the cell or the cell group corresponding to the second path, data sent by the radio access network through the cell or the cell group corresponding to the second path. The cell or the cell group corresponding to the first path and the cell or the cell group corresponding to the second path may belong to one DU, and the configuration information may be generated by the one DU and sent by the DU to the terminal device, or generated by a CU corresponding to the DU and sent to the terminal device through the DU. The cell or the cell group corresponding to the first path and the cell or the cell group corresponding to the second path may alternatively belong to different DUs.

Optionally, in a scenario in which the CU generates the configuration information of the duplication mode, the CU sends the configuration information of the duplication mode to the DU through an F1 interface. Optionally, the configuration information further includes a configuration of an identifier of at least one radio bearer in the duplication mode, a configuration of a PDCP entity in each radio bearer, configurations of at least two RLC entities corresponding to the PDCP entity (for example, identifiers of the RLC entities or identifiers of paths), cells or cell groups corresponding to the paths on which the RLC entities are located, an identifier of a session to which data on each radio bearer belongs, a quality of service flow identifier corresponding to each radio bearer, a quality of service parameter, and the like. After the duplication mode is activated, the DU schedules the data based on the cells or the cell groups corresponding to the paths on which the RLC entities are located. For example, an RLC entity 1 and an RLC entity 2 corresponding to a radio bearer correspond to a cell group 1 and a cell group 2, respectively. In this case, when receiving data on the RLC entity 1 corresponding to the radio bearer, the DU schedules the data on the RLC entity 1 to a cell in the cell group 1 for transmission; or when receiving data from the RLC entity 2, the DU schedules the data on the RLC entity 2 to a cell in the cell group 2 for transmission.

Optionally, when the CU and the DU establish a tunnel for each radio bearer of the terminal device through the F1 interface, the CU adds the configuration information of the duplication mode to configuration information of each radio bearer. For example, the CU provides an identifier of the radio bearer, the configuration information of the duplication mode, and a tunnel address of the radio bearer in the CU. In another possible implementation, for a control plane, the CU sends, to the DU through the F1 interface, an RRC message including the configuration information of the duplication mode, so that the DU can forward the RRC message to the UE. The DU may parse the RRC message to obtain the configuration information of the duplication mode. Particularly, if the RRC message does not include the cells or the cell groups corresponding to the paths on which the RLC entities are located, the CU notifies, via another message, the DU of the cells or the cell groups corresponding to the paths on which the RLC entities are located.

Optionally, the cells or the cell groups corresponding to the paths on which the RLC entities are located and RLC/MAC/PHY layer configuration information of the radio bearer are determined by the DU. The DU notifies, through the F1 interface, the CU of the cells or the cell groups corresponding to the paths on which the at least two RLC entities corresponding to the radio bearer are located and the RLC/MAC/PHY layer configuration information of the radio bearer, so that the CU adds the information to the RRC message and notifies the UE.

In step 401, the terminal device may receive the configuration information in a process of accessing the radio access network. For example, the terminal device establishes an RRC connected mode, for example, performs initial access, handover, and radio link reestablishment, when accessing the radio access network.

In step 401, the configuration information may be carried in an RRC message. The configuration information may further indicate configurations of a first RLC entity and a second RLC entity that correspond to one PDCP entity in one radio bearer in the duplication mode. For example, different identifiers are configured for the two RLC entities (in other words, the first path and the second path). The different identifiers may be different logical channel identifiers or newly defined different identifiers.

Optionally, during transmission on the uplink, the configuration information may further indicate which of the first RLC entity and the second RLC entity is allowed to be used by the terminal to transmit data when the duplication mode is deactivated. This implementation may be used in a single-radio access device carrier aggregation or dual connectivity scenario.

Optionally, the configuration information of the duplication mode may be generated by the CU and sent to the terminal device via the RRC message. Because no RRC layer on the DU corresponds to that on the CU, the DU does not parse the RRC message, but directly forwards the RRC message to the terminal device. Further, the CU adds the configuration information of the duplication mode to a CU-DU interface message that can be parsed by the DU, and sends the CU-DU interface message to the DU, so that the DU completes configuration of the duplication mode.

Optionally, in the dual connectivity scenario, the configuration information may indicate that when the duplication mode is deactivated, non-duplicated data is sent between the terminal device and at least one of a primary radio access device and a secondary radio access device. In a possible implementation, the terminal device may be configured to send data or a data volume report on a path on which at least one of the primary radio access device and the secondary radio access device is located, and a data volume threshold may be further configured for the terminal device. If a to-be-sent data volume of the terminal device exceeds the data volume threshold, the terminal device sends data to the primary radio access device and the secondary radio access device, thereby implementing split transmission of non-duplicated data; or if a to-be-sent data volume of the terminal device does not exceed the data volume threshold, the terminal device sends data to the configured one of the primary radio access device and the secondary radio access device. In this possible implementation, because data is always being sent at RLC layers, the radio access network and the terminal device do not know whether a data transmission mode changes, and implementation is simple; or the terminal device and the radio access network maintain same RLC numbering records at RLC layers, so that when the duplication mode is activated, numbers of same data transmitted between the terminal device and the radio access network are still the same.

Optionally, regardless of the uplink or the downlink, if the configuration information indicates a primary cell or a master cell group corresponding to the first path, the first path is activated by default to send non-duplicated data; or if the configuration information indicates a secondary cell or a secondary cell group corresponding to the second path, the second path is disabled by default, or is prohibited from sending duplicated data but can send non-duplicated data. In this case, the duplication mode is deactivated. On the uplink, the terminal device sends non-duplicated data on the first path and the second path. On the downlink, the terminal device receives, on the first path and the second path, non-duplicated data sent by the radio access network.

Optionally, regardless of the uplink or the downlink, if the configuration information indicates a primary cell or a master cell group corresponding to the first path, the first path is activated by default to send duplicated data; or if the configuration information indicates a secondary cell or a secondary cell group corresponding to the second path, the second path is activated by default to send duplicated data. In this case, the duplication mode is activated. On the uplink, the terminal device sends duplicated data on the first path and the second path. On the downlink, the terminal device receives, on the first path and the second path, duplicated data sent by the radio access network.

Optionally, in the dual connectivity scenario, a radio access device that sends a first indication message is determined through negotiation between the primary radio access device and the secondary radio access device, and the radio access device that sends the first indication message is notified to the terminal device in the configuration information. If the terminal device receives a first indication message sent by a radio access device that is not notified, the terminal ignores the first indication message sent by the radio access device.

Optionally, in the dual connectivity scenario, the configuration information indicates that the terminal device determines, based on the first indication message sent by the primary radio access device, whether a radio bearer of the primary radio access device is activated, and ignores a first indication message sent by the secondary radio access device.

Optionally, in the dual connectivity scenario, the configuration information indicates that the terminal device determines, based on the first indication message sent by the secondary radio access device, whether a radio bearer of the secondary radio access device is activated, and ignores a first indication message sent by the primary radio access device.

Optionally, in the dual connectivity scenario, if the primary radio access device duplicates data transmitted on the secondary radio access device, the terminal device determines, based on the first indication message sent by the secondary radio access device, whether a radio bearer is activated, and ignores a first indication message sent by the primary radio access device. If the secondary radio access device splits data transmitted on the primary radio access device, the terminal device determines, based on the first indication message sent by the primary radio access device, whether a radio bearer is activated, and ignores a first indication message sent by the secondary radio access device.

Optionally, the configuration information indicates whether a type of the radio bearer is the duplication mode.

Optionally, the configuration information indicates, specifically through presence or absence of an information element, whether a type of a radio bearer is a duplication mode. If the configuration information includes the information element, the type of the radio bearer is the duplication mode; otherwise, the type of the radio bearer is not the duplication mode. Optionally, if the configuration information includes the information element indicating that the radio bearer is a radio bearer in the duplication mode, the configuration information further indicates whether the duplication mode is activated.

Optionally, in the dual connectivity scenario, the configuration information may specifically indicate a data transmission path of a radio bearer, to indicate whether the radio bearer is in the duplication mode. When the data transmission path indicated in the configuration information is one of a path on which the primary radio access device is located and a path on which the secondary radio access device is located, the radio bearer is not in the duplication mode, or that the duplication mode is deactivated. When the data transmission path indicated in the configuration information is a path on which the primary radio access device is located and a path on which the secondary radio access device is located, the type of the radio bearer is the duplication mode.

According to the technical solution provided in the third embodiment, the radio access network may configure configuration information of a duplication mode on at least one of the downlink and the uplink for the terminal device, so as to implement configuration management of the duplication mode on at least one of the downlink and the uplink.

A fourth embodiment of this application provides a communication processing method, and relates to how to number duplicated data on at least two RLC entities (for example, a first RLC entity and a second RLC entity) corresponding to one PDCP entity on an uplink or a downlink in a duplication mode, so as to complete a communication processing procedure at an RLC layer. The fourth embodiment may be based on the architecture, of the protocol stack of the wireless communications system, shown in any one of FIG. 1A, FIG. 1B to FIG. 1F, and FIG. 1G and FIG. 1H. On the uplink, a transmit end may be a terminal device, and a receive end is a radio access network; or on the downlink, a transmit end is a radio access network, and a receive end is a terminal device. The fourth embodiment may be independent of the foregoing embodiments, or may be used as a further processing procedure of the first embodiment to the third embodiment at the RLC layer.

When the duplication mode is activated, duplicated data on the first RLC entity and the second RLC entity has a same number or different numbers.

When the duplicated data has the same number, the transmit end sends a second indication message to the receive end, where the second indication message indicates a start number of the duplicated data on the second RLC entity in the duplication mode. In this case, the receive end may determine, based on the start number of the duplicated data on the second RLC entity, which duplicated data from the transmit end has been received. If duplicated data on one of a first path and a second path has been received by the receive end, even if the duplicated data on the other path has not been received, the receive end indicates, in an RLC layer status report, that the duplicated data has been received, and does not instruct the other path to retransmit the duplicated data. In this case, the receive end sends only one RLC status report to the transmit end, and does not need to generate an RLC status report for each of the two RLC entities.

Optionally, when the duplicated data has different numbers, the transmit end notifies the receive end of a difference between the different numbers of the duplicated data on the first RLC entity and the second RLC entity.

Optionally, when receiving an RLC status report of one of the first RLC entity and the second RLC entity, the receive end may determine a number of the duplicated data on the other RLC entity based on the difference. Optionally, the receive end considers by default that a start number of the duplicated data on the second RLC entity starts from a default integer (for example, 0). The receive end may calculate a number of the duplicated data on the second RLC entity based on the difference and a number of the duplicated data in an RLC status report of the first RLC entity. When the duplication mode switches from an activated state to a deactivated state, the start number of the duplicated data on the second RLC entity is reset to the default integer (for example, 0).

Optionally, when the duplicated data has the different numbers, an RLC status report is generated for each of the first RLC entity and the second RLC entity corresponding to the one PDCP entity at the receive end. The receive end may convert a number of the duplicated data on the first RLC entity into a number of the duplicated data on the second RLC entity based on the difference between the different numbers of the duplicated data, and send the number of the duplicated data on the second RLC entity to the second RLC entity at the receive end via an RLC status report of the second RLC entity. Alternatively, the receive end may convert a number of the duplicated data on the second RLC entity into a number of the duplicated data on the first RLC entity based on the difference between the different numbers of the duplicated data, and send the number of the duplicated data on the first RLC entity to the first RLC entity at the receive end via an RLC status report of the first RLC entity.

Optionally, when the duplicated data has the different numbers, the receive end converts a number of the duplicated data on one of the first RLC entity and the second RLC entity into a number of the duplicated data on the other RLC entity based on the difference between the different numbers of the duplicated data, adds the number of the duplicated data on the other RLC entity to an RLC status report corresponding to the other RLC entity, and sends the RLC status report to the transmit end.

Optionally, when the duplication mode is deactivated, a number of duplicated data on the second RLC entity at the transmit end is set to 0, or the transmit end stores a value of the last number received currently.

Optionally, for data transmission on the uplink, the terminal device determines, based on a deviation between transmission rates of data packets on two paths (for example, by detecting a deviation between RLC numbers of data packets arriving at two RLC entities at the same time), whether to deactivate the duplication mode.

In this case, optionally, if the deviation between the transmission rates of the data packets on the two paths is greater than a threshold, the terminal may automatically trigger deactivation of the duplication mode.

In this case, optionally, if a deviation between numbers of same PDCP data packets on the two paths is greater than a threshold (for example, 0), the PDCP entity may notify the deviation to an RLC entity on a path corresponding to a PDCP data packet having a smaller number in the same PDCP data packets, so that the RLC entity on the path adds an RLC receive status variable and the derivation, to avoid the following problem: A path with a lower transmission rate frequently sends an RLC status report to notify the terminal device of data packets that have not been received, and if retransmission fails, an unnecessary radio link failure may be caused.

In this case, optionally, if the deviation between the transmission rates of the data packets on the two paths is greater than a threshold, the PDCP entity in the radio access network may notify an RLC entity on a path with a lower transmission rate of a number of a PDCP data packet received on a path with a higher transmission rate, so that the RLC entity on the path with the lower transmission rate determines, based on a number of a PDCP data packet corresponding to a received RLC data packet and the notified number of the PDCP data packet, a step by which an RLC receiving window on the path with the lower transmission rate moves to an RLC receiving window on the path with the higher transmission rate. For example, the RLC receiving window on the path with the lower transmission rate and the RLC receiving window on the path with the higher transmission rate keep the same as each other via the step.

In a CU-DU networking architecture, because the PDCP entity is located on a CU, and the RLC entities are located on a DU, the foregoing various types of information sent by the PDCP entity to the RLC entities are sent by the CU to the DU in physical implementation.

Optionally, in a dual connectivity scenario, for data transmission on the downlink, if detecting that a derivation between numbers of PDCP data packets received on two paths reaches a preset threshold, the terminal device instructs the radio access network (for example, a primary radio access device or a secondary radio access device) to send a report, where the report indicates that the derivation between the numbers of the PDCP data packets reaches the preset threshold, so that the radio access network determines whether to deactivate the duplication mode.

According to the technical solution provided in the fourth embodiment of this application, the transmit end can number the duplicated data in the duplication mode, so that the receive end can learn whether the duplicated data on the two paths has been received.

Figure 14:
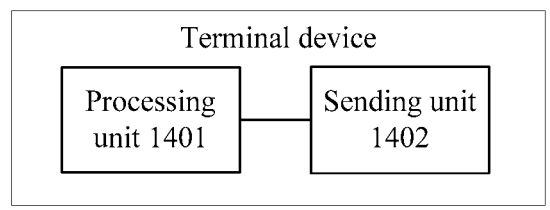
FIG. 14 and FIG. 15 are schematic structural diagrams of a communications apparatus according to an embodiment of this application.

A fifth embodiment of this application provides a terminal device. As shown in FIG. 14, the terminal device includes a processing unit 1401 and a sending unit 1402.

The processing unit 1401 is configured to determine that a data volume report needs to be triggered for one of a first path and a second path that are in a radio bearer in a duplication mode, where in the duplication mode, PDCP data on the radio bearer is transmitted on a corresponding first RLC entity on the first path, and is duplicately transmitted on a corresponding second RLC entity on the second path.

The processing unit 1401 is further configured to trigger the data volume report, where the data volume report indicates a data volume on the one path.

The sending unit 1402 is configured to send the data volume report to a radio access network.

The processing unit 1401 is configured to perform processing actions such as determining and triggering that are performed by the terminal device in the foregoing communication processing method embodiments, and the sending unit 1402 is configured to perform sending actions in the foregoing communication processing method embodiments. Optionally, the terminal device further includes a receiving unit 1403 (not shown in FIG. 14), configured to perform receiving actions of the terminal device in the foregoing communication processing method embodiments. Optionally, the communications apparatus is the terminal device or a part of the terminal device. Optionally, the processing unit 1401 may be a processor of the terminal device, the sending unit 1402 may be a transmitter of the terminal device, and the receiving unit 1403 is a receiver of the terminal device. Further, the terminal device may further include another electronic line, for example, a bus connecting the processor and the transmitter, and a radio frequency antenna used for sending a signal. Optionally, the communications apparatus may alternatively be a chip.

Figure 15:
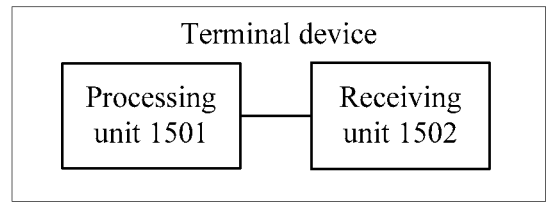

A sixth embodiment of this application provides a communications apparatus. As shown in FIG. 15, the communications apparatus includes a processing unit 1501 and a receiving unit 1502.

The receiving unit 1502 is configured to receive a first indication message sent by a radio access network, where the first indication message indicates whether to activate a duplication mode of a radio bearer, and in the duplication mode, PDCP data on the radio bearer is transmitted on a corresponding first RLC entity on a first path, and is duplicately transmitted on a corresponding second RLC entity on a second path.

The processing unit 1501 is configured to activate or deactivate the duplication mode of the radio bearer based on the first indication message.

The processing unit 1501 is configured to perform processing actions such as determining and triggering that are performed by the terminal device in the foregoing communication processing method embodiments, and the receiving unit 1502 is configured to perform receiving actions of the terminal device in the foregoing communication processing method embodiments. The communications apparatus may further include a sending unit 1503 (not shown in FIG. 15), configured to perform sending actions in the foregoing communication processing method embodiments. Optionally, the communications apparatus is the terminal device or a part of the terminal device. Optionally, the processing unit 1501 may be a processor of the terminal device, the sending unit 1503 may be a transmitter of the terminal device, and the receiving unit 1502 is a receiver of the terminal device. Further, the terminal device may further include another electronic line, for example, a bus connecting the processor and the transmitter, and a radio frequency antenna used for sending a signal. Optionally, the communications apparatus may alternatively be a chip. The technical solution provided in the fourth aspect has the technical effects of the foregoing corresponding implementations. For details, refer to the foregoing implementations.

Figure 16:
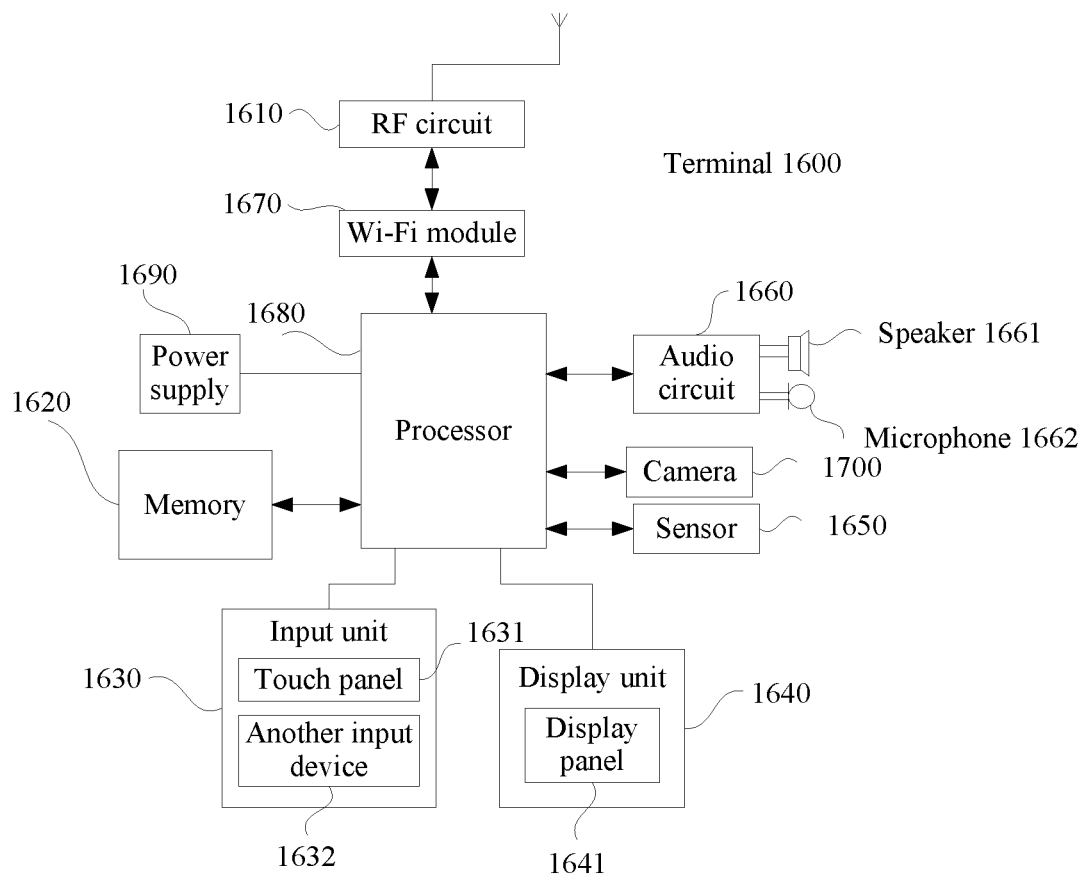
FIG. 16 is a schematic hardware structural diagram of a terminal device according to an embodiment of this application.

An embodiment of this application further provides a schematic structural diagram of a terminal device 1600 shown in FIG. 16. A structure of the terminal 1600 may be used as a general structure of the terminal device in the foregoing embodiments. The terminal 1600 includes components such as a radio frequency (RF) circuit 1610, a memory 1620, an input unit 1630, a display unit 1640, a sensor 1650, an audio circuit 1660, a wireless fidelity (Wi-Fi) module 1670, a processor 1680, and a power supply 1690.

The RF circuit 1610 may be configured to receive and send information, or receive and send a signal during a call. For example, after receiving data from a radio access device, the RF circuit 1610 sends the data to the processor 1680 for processing, and sends the data to a base station. Usually, the RF circuit includes but is not limited to an antenna, at least one amplifier, a transceiver, a coupler, a low noise amplifier (LNA), a duplexer, and the like.

The memory 1620 may be configured to store a software program and a module, and the processor 1680 executes various functional applications and data processing of the terminal 1600 by running the software program and the module that are stored in the memory 1620. The memory 1620 may mainly include a program storage area and a data storage area. The program storage area may store an operating system, an application program required for at least one function (such as a voice playback function and an image display function), and the like; and the data storage area may store data (such as audio data and a phone book) created based on use of the terminal 1600, and the like. In addition, the memory 1620 may include a high speed random access memory, and may further include a nonvolatile memory, such as at least one magnetic disk storage device, a flash storage device, or another volatile solid-state storage device.

The input unit 1630 may be configured to: receive input digit or character information and generate key signal input related to user setting and function control of the terminal 1600. Specifically, the input unit 1630 may include a touch panel 1631 and another input device 1632. The touch panel 1631, also referred to as a touchscreen, may collect a touch operation performed by a user on or near the touch panel (for example, an operation performed by the user on or near the touch panel 1631 via any suitable object or accessory such as a finger or a stylus), and drive a corresponding connection apparatus according to a preset program. Optionally, the touch panel 1631 may include two parts: a touch detection apparatus and a touch controller. The touch detection apparatus detects a location touched by the user, detects a signal brought by a touch operation, and transmits the signal to the touch controller. The touch controller receives touch information from the touch detection apparatus, converts the touch information into touch point coordinates, and sends the touch point coordinates to the processor 1680, and can receive and execute a command sent by the processor 1680. In addition, the touch panel 1631 may be implemented in a plurality of types, such as a resistive type, a capacitive type, an infrared type, and a surface acoustic wave type. The input unit 1630 may include the another input device 1632 in addition to the touch panel 1631. Specifically, the another input device 1632 may include but is not limited to one or more of a physical keyboard, a function key (such as a volume control key or a switch key), a trackball, a mouse, a joystick, and the like.

The display unit 1640 may be configured to display information entered by the user or information provided for the user, and various menus of the terminal 1600. The display unit 1640 may include a display panel 1641. Optionally, the display panel 1641 may be configured in a form of a liquid crystal display (LCD), an organic light-emitting diode (OLED), or the like. Further, the touch panel 1631 may cover the display panel 1641. When detecting a touch operation on or near the touch panel 1631, the touch panel 1631 transmits information about the touch operation to the processor 1680 to determine a type of a touch event, and then the processor 1680 provides corresponding visual output on the display panel 1641 based on the type of the touch event. Although the touch panel 1631 and the display panel 1641 in FIG. 16 are used as two independent parts to implement input and output functions of the terminal 1600, in some embodiments, the touch panel 1631 and the display panel 1641 may be integrated to implement the input and output functions of the terminal 1600.

The terminal 1600 may further include at least one sensor 1650 such as a light sensor, a motion sensor, and another sensor. Specifically, the light sensor may include an ambient light sensor and a proximity sensor. The ambient light sensor may adjust luminance of the display panel 1641 based on brightness of ambient light. The light sensor may turn off the display panel 1641 and/or backlight when the terminal 1600 moves to an ear. As a type of motion sensor, an acceleration sensor may detect values of acceleration in directions (usually three axes), may detect, in a static state, a value and a direction of gravity, and may be used for an application that identifies a posture (such as screen switching between a landscape mode and a portrait mode, a related game, and magnetometer posture calibration) of the terminal, a vibration-identification-related function (such as a pedometer and tapping), and the like. Other sensors that can be configured for the terminal 1600, such as a gyroscope, a barometer, a hygrometer, a thermometer, and an infrared sensor, are not described herein.

The audio circuit 1660, a speaker 1661, and a microphone 1662 may provide audio interfaces between the user and the terminal 1600. The audio circuit 1660 may transmit, to the speaker 1661, an electrical signal that is obtained through conversion of received audio data, and the speaker 1661 converts the electrical signal into an audio signal and outputs the audio signal. In addition, the microphone 1662 converts a collected audio signal into an electrical signal, the audio circuit 1660 receives the electrical signal, converts the electrical signal into audio data, and outputs the audio data to the processor 1680 for processing, and then processed audio data is sent to, for example, another terminal, via the RF circuit 1610, or the audio data is output to the memory 1620 for further processing.

Wi-Fi is a short-distance wireless transmission technology. Via the Wi-Fi module 1670, the terminal 1600 can help the user receive and send an email, browse a web page, access streaming media, and the like. The Wi-Fi module 1670 provides wireless broadband Internet access for the user. Although FIG. 16 shows the Wi-Fi module 1670, it can be understood that the Wi-Fi module 1670 is not a mandatory constituent part of the terminal 1600, and may be totally omitted depending on requirements without changing the essence of this application.

The processor 1680 is a control center of the terminal 1600, and is connected to various parts of the entire terminal 1600 via various interfaces and lines. By running or executing the software program and/or the module stored in the memory 1620, and invoking data stored in the memory 1620, the processor 1680 performs various functions of the terminal 1600 and processes data, thereby performing overall monitoring on the terminal 1600. Optionally, the processor 1680 may include one or more processing units. For example, an application processor and a modem processor may be integrated into the processor 1680. The application processor mainly processes an operating system, a user interface, an application program, and the like; and the modem processor mainly processes wireless communication. It may be understood that the foregoing modem processor may alternatively not be integrated into the processor 1680.

The terminal 1600 further includes the power supply 1690 (for example, a battery) that supplies power to the components. Optionally, the power supply may be logically connected to the processor 1680 via a power management system. In this way, functions such as management of charging, discharging, and power consumption are implemented via the power management system.

The terminal 1600 may further include a camera 1700. The camera may be a front-facing camera, or may be a rear-facing camera. Although not shown, the terminal 1600 may further include a Bluetooth module, a global positioning system (GPS) module, and the like. Details are not described herein.

In this application, the processor 1680 included in the terminal 1600 may be configured to perform the foregoing communication processing method embodiments, and implementation principles and technical effects thereof are similar to those of the foregoing communication processing method embodiments. Details are not described herein again.

An embodiment of this application further provides a communications apparatus, including a processor and a memory. The memory stores code, and when the code is invoked by the processor, actions of the method performed by the terminal device in the foregoing communication processing method embodiments are implemented. The communications apparatus may be the terminal device, or the communications apparatus may be a chip. The chip includes a processor including at least one gate circuit and a memory including at least one gate circuit, each gate circuit includes at least one transistor (for example, a field effect transistor) connected through a conducting wire, and each transistor is made of a semiconductor material. The chip may be a central processing unit (CPU), or may be a field programmable gate array (FPGA) or a digital signal processor (DSP).

Persons skilled in the art should understand that the embodiments of the present application may be provided as a method, a system, or a computer program product. Therefore, the present application may use a form of hardware only embodiments, software only embodiments, or embodiments with a combination of software and hardware. Moreover, the present application may use a form of a computer program product that is implemented on one or more chip systems or computer-usable storage media (including but not limited to a magnetic disk memory, a CD-ROM, an optical memory, and the like) that include computer-usable program code.

The present application is described with reference to the flowcharts and/or block diagrams of the method, the apparatus (system), and the computer program product according to the embodiments of the present application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by the computer or the processor of another programmable data processing device generate an apparatus for implementing a specified function in one or more processes in the flowcharts and/or in one or more blocks in the block diagrams.

These computer program instructions may be alternatively stored in a computer readable memory that can instruct a computer or another programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may be alternatively loaded onto a computer or another programmable data processing device, so that a series of operation steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Although some embodiments of the present application have been described, persons skilled in the art can make changes and modifications to these embodiments once they learn of the basic inventive concept. Therefore, the appended claims are intended to be construed as covering the preferred embodiments and all changes and modifications falling within the scope of the present application.

Apparently, persons skilled in the art can make various modifications and variations to the present application without departing from the scope of the present application. The present application is intended to cover these modifications and variations to the present application provided that they fall within the scope of the claims of the present application and equivalent technologies thereof.

What is claimed is:

1. A method, comprising:
receiving, by a terminal device, a first indication message from a radio access network, wherein the first indication message indicates whether to activate a duplication mode of a radio bearer, wherein when the duplication mode is activated, data from a packet data convergence protocol (PDCP) entity in the radio bearer is transmitted on a corresponding first radio link control (RLC) entity on a first path, and is duplicately transmitted on a corresponding second RLC entity on a second path; and
activating or deactivating, by the terminal device, the duplication mode of the radio bearer based on the first indication message,
wherein the first indication message comprises a first field and a second field, wherein the first field indicates that the first indication message is a control message for the duplication mode, and the second field indicates whether to activate the duplication mode;
wherein the method further comprises:
when a quantity of retransmission times of duplicated data on the second RLC entity reaches a maximum quantity of RLC retransmission times, triggering, by the terminal device, a failure of a radio link without reestablishing the radio link; or
when a quantity of retransmission times of duplicated data on the second RLC entity reaches a maximum quantity of RLC retransmission times, determining, by the terminal device, a radio link failure is not triggered.

2. The method according to claim 1,
wherein the radio bearer corresponds to a bit in the second field,
wherein a bit state of the bit in the second field indicates whether to activate the duplication mode, and
wherein a position of the bit in the second field indicates the radio bearer corresponding to the duplication mode.

3. The method according to claim 2, wherein the position of the bit in the second field corresponding to the radio bearer is arranged based on a value of an identifier of the radio bearer.

4. The method according to claim 3, wherein the second field comprises bits corresponding to radio bearers, and positions of the bits in the second field are arranged in ascending order of identifier values of the radio bearers.

5. The method according to claim 1, wherein the first path is an always activated path, and the second field indicates whether to activate the second path, wherein the duplication mode is activated when the second path is activated.

6. The method according to claim 1, further comprising:
receiving, by the terminal device, a notification of the radio access network, wherein the notification indicates a primary RLC entity from among the first RLC entity and the second RLC entity, wherein the other RLC entity except the primary RLC entity from among the first RLC entity and the second RLC entity is a secondary RLC entity; and
when the duplication mode is deactivated, transmitting, by the terminal device, the data from the PDCP entity on the primary RLC entity without transmitting the data from the PDCP entity on the secondary RLC entity, or transmitting non-duplicated data from the PDCP entity on the secondary RLC entity.

7. The method according to claim 1, wherein
in a dual connectivity scenario and when a data volume is less than a threshold, transmitting, by the terminal device, the data from the PDCP entity on the first RLC entity without transmitting the data from the PDCP entity on the second RLC entity.

8. The method according to claim 1, wherein
in a dual connectivity scenario and when a data volume is greater than or equal to a threshold, transmitting, by the terminal device, the data from the PDCP entity on the first RLC entity, and transmitting non-duplicated data from the PDCP entity on the second RLC entity.

9. The method according to claim 1, wherein the first indication message indicates that the duplication mode is deactivated, and the method further comprises:
discarding, by the terminal device, duplicated data on the second RLC entity.

10. The method according to claim 1, wherein the first indication message indicates that the duplication mode is deactivated, and the method further comprises:
determining, by the terminal device, duplicated data on the second RLC entity that does not need to be transmitted through an air interface; and
continuing to transmit, by the transmit device, the determined duplicated data on the second RLC entity when the determined duplicated data on the second RLC entity has started to be transmitted through the air interface.

11. An apparatus, comprising:
a memory storing instructions; and
at least one processor, wherein the instructions are executed by the at least one processor to cause the apparatus to:
receive a first indication message from a radio access network, wherein the first indication message indicates whether to activate a duplication mode of a radio bearer, wherein when the duplication mode is activated, data from a packet data convergence protocol (PDCP) entity in the radio bearer is transmitted on a corresponding first a radio link control (RLC) entity on a first path, and is duplicately transmitted on a corresponding second RLC entity on a second path; and
activate or deactivate, the duplication mode of the radio bearer based on the first indication message,
wherein the first indication message comprises a first field and a second field, wherein the first field indicates that the first indication message is a control message for the duplication mode, and the second field indicates whether to activate the duplication mode;
wherein the instructions are executed by the at least one processor to cause the apparatus to:
when a quantity of retransmission times of duplicated data on the second RLC entity reaches a maximum quantity of RLC retransmission times, trigger a radio link failure of a radio link without reestablishing the radio link; or
when a quantity of retransmission times of duplicated data on the second RLC entity reaches a maximum quantity of RLC retransmission times, determine a radio link failure is not triggered.

12. The apparatus according to claim 11,
wherein the radio bearer corresponds to a bit in the second field, wherein a bit state of the bit in the second field indicates whether to activate the duplication mode, and wherein a position of the bit in the second field indicates the radio bearer corresponding to the duplication mode.

13. The apparatus according to claim 12, wherein the position of the bit in the second field corresponding to the radio bearer is arranged based on a value of an identifier of the radio bearer.

14. The apparatus according to claim 13, wherein the second field comprises bits corresponding to radio bearers, and positions of the bits in the second field are arranged in ascending order of identifier values of the radio bearers.

15. The apparatus according to claim 11, wherein the first path is an always activated path, and the second field indicates whether to activate the second path, wherein the duplication mode is activated when the second path is activated.

16. The apparatus according to claim 11, wherein the instructions are executed by the at least one processor to further cause the apparatus to:

receive a notification of the radio access network, wherein the notification indicates a primary RLC entity from among the first RLC entity and the second RLC entity, wherein the other RLC entity except the primary RLC entity from among the first RLC entity and the second RLC entity is a secondary RLC entity; and when the duplication mode is deactivated, transmit the data from the PDCP entity on the primary RLC entity without transmitting the data from the PDCP entity on the secondary RLC entity, or transmit non-duplicated data from the PDCP entity on the secondary RLC entity.

17. The apparatus according to claim 11, wherein the instructions are executed by the at least one processor to further cause the apparatus to:

in a dual connectivity scenario and when a data volume is less than a threshold, transmit the data from the PDCP entity on the first RLC entity without transmitting the data from the PDCP entity on the second RLC entity.

18. The apparatus according to claim 11, wherein the instructions are executed by the at least one processor to cause the apparatus to:

in a dual connectivity scenario and when a data volume is greater than or equal to a threshold, transmit the data from the PDCP entity on the first RLC entity, and transmit non-duplicated data from the PDCP entity on the second RLC entity.

19. The apparatus according to claim 11, wherein the instructions are executed by the at least one processor to cause the apparatus to:

when the first indication message indicates that the duplication mode is deactivated, discard duplicated data on the second RLC entity.

20. The apparatus according to claim 11, wherein the instructions are executed by the at least one processor to cause the apparatus to:

when the first indication message indicates that the duplication mode is deactivated, determine duplicated data on the second RLC entity that does not need to be transmitted through an air interface; and continue to transmit the determined duplicated data on the second RLC entity when the determined duplicated data on the second RLC entity has started to be transmitted through the air interface.

21. The method according to claim 5, wherein the duplication mode of the radio bearer is configured with multiple RLC entities corresponding to multiple second logical channels, and the multiple second logical channels comprise the second path corresponding to the second RLC entity; and wherein the second field comprises multiple bits corresponding to the multiple second logical channels, each bit of the multiple bits indicates a corresponding second logical channel via a position of the bit and indicates, via a bit state of the bit, whether the corresponding second logical channel is activated.

22. The apparatus according to claim 15, wherein the duplication mode of the radio bearer is configured with multiple RLC entities corresponding to multiple second logical channels, and the multiple second logical channels comprise the second path corresponding to the second RLC entity; and wherein the second field comprises multiple bits corresponding to the multiple second logical channels, each bit of the multiple bits indicates a corresponding second logical channel via a position of the bit and indicates, via a bit state of the bit, whether the corresponding second logical channel is activated.

* * * * *